(12) United States Patent
I et al.

(10) Patent No.: US 7,509,800 B2
(45) Date of Patent: Mar. 31, 2009

(54) EXHAUST SYSTEM OF MULTI-CYLINDER INTERNAL COMBUSTION ENGINE

(75) Inventors: Sungi I, Kanagawa (JP); Takao Inoue, Yokohama (JP); Kimiyoshi Nishizawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/295,728

(22) Filed: Dec. 7, 2005

(65) Prior Publication Data

US 2006/0137330 A1 Jun. 29, 2006

Related U.S. Application Data

(63) Continuation-in-part of application No. 11/145,962, filed on Jun. 7, 2005.

(30) Foreign Application Priority Data

| Jun. 8, 2004 | (JP) | ............................. 2004-169394 |
| Jul. 13, 2004 | (JP) | ............................. 2004-205357 |
| Apr. 8, 2005 | (JP) | ............................. 2005-111478 |

(51) Int. Cl.
*F01N 3/00* (2006.01)
(52) U.S. Cl. ............................. 60/288; 60/278; 60/312
(58) Field of Classification Search ................... 60/287, 60/288, 312, 313, 278
See application file for complete search history.

(56) References Cited

U.S. PATENT DOCUMENTS

| 5,072,583 | A | * | 12/1991 | Urushihara et al. ........... 60/313 |
| 5,277,026 | A | | 1/1994 | Boll et al. |
| 5,433,073 | A | | 7/1995 | Duret et al. |
| 2002/0062642 | A1 | * | 5/2002 | Dini et al. ..................... 60/288 |

FOREIGN PATENT DOCUMENTS

| DE | 101 51 530 A1 | 4/2003 |
| EP | 0 584 350 B1 | 3/1994 |
| EP | 1 188 909 A2 | 3/2002 |
| JP | 05-321644 A | 12/1993 |
| JP | 07-077034 A | 3/1995 |
| JP | 07-22016 | 4/1995 |
| JP | 2002-213236 A | 7/2002 |
| WO | WO 93/18285 A1 | 9/1993 |

* cited by examiner

*Primary Examiner*—Thomas E Denion
*Assistant Examiner*—Diem Tran
(74) *Attorney, Agent, or Firm*—Foley & Lardner LLP

(57) ABSTRACT

An exhaust system of an internal combustion engine having at least one cylinder comprises a main exhaust passage connected to the cylinder; a main catalytic converter disposed in the main exhaust passage; a bypass exhaust passage that diverges from the main exhaust passage, the bypass exhaust passage having a gas flow resistance larger than that of the main exhaust passage and having a downstream end connected to the main exhaust passage at a position upstream of the main catalytic converter; an auxiliary catalytic converter disposed in the bypass exhaust passage; and a gas flow switching device that is capable of forcing exhaust gas from the cylinder of the engine to flow toward the bypass exhaust passage when assuming a given operation position.

21 Claims, 16 Drawing Sheets

EXHAUST SYSTEM OF MULTI-CYLINDER INTERNAL COMBUSTION ENGINE

This application is C-I-P of U.S. patent application Ser. No. 11/145,962, filed Jun. 7, 2005, the contents of which are incorporated herein by reference.

BACKGROUND OF THE INVENTION

1. Field of the Invention

The present invention relates in general to exhaust systems of a multi-cylinder internal combustion engine, that have a catalytic converter for purifying the exhaust gas from the engine, and more particularly to the exhaust systems of a double converter type that has main and auxiliary catalytic converters wherein when, like in a condition just after cold starting of the engine, the main catalytic converter is not sufficiently activated, the exhaust gas is enforcedly led to the auxiliary catalytic converter that is easily activated.

2. Description of the Related Art

Usually, in motor vehicles powered by an internal combustion engine, the exhaust system of the engine is arranged beneath a floor of the vehicle and has a catalytic converter installed therein. If the catalytic converter is arranged in a relatively downstream position of the system, the converter takes a long time to be heated to a sufficient level for the gas purifying operation thereof particularly in a condition just after cold starting of the engine. That is, for such long time, the catalytic converter fails to exhibit its normal gas purifying work. However, if, for solving the above-mentioned drawback, the catalytic converter is arranged in a relatively upstream position of the system, that is, a position near the engine, another drawback tends to arise wherein due to attack of heat of the engine and the highly heated exhaust gas from the engine, the durability of the catalytic converter is lowered.

In order to solve the above-mentioned drawbacks, various measures have been proposed, one of which is disclosed in Japanese Laid-open Patent Application (Tokkaihei) 5-321644. In this measure, a main passage extends from an exhaust manifold of the engine to a main catalytic converter. A bypass passage having an auxiliary catalytic converter installed therein extends from an upstream part of the main passage to a downstream part of the same. A switch valve is arranged at the upstream part of the main passage to open and close the main and bypass passages selectively, and a controller is connected to the switch valve. In operation, just after cold starting of the engine, the controller controls the switch valve to take a bypass position to introduce the exhaust gas from the engine into the bypass passage.

Since, in this measure, the auxiliary catalytic converter is positioned at a relatively upstream portion of the exhaust system, earlier activation of the auxiliary catalytic converter is expected, which induces earlier exhaust gas purifying work by the exhaust system.

SUMMARY OF THE INVENTION

In the measure of the above-mentioned patent application publication, the gas inlet port of the bypass passage is positioned downstream of a branch junction portion of the exhaust manifold. That is, from a portion that is downstream of the junction portion where exhaust gas paths of all cylinders of the engine are joined, there extend the main and bypass passages in parallel. Thus, even though the auxiliary catalytic converter can take a more upstream position than the main catalytic converter, the distance from the exhaust port of each cylinder to the auxiliary catalytic converter can not be so short, and thus actually, the earlier exhaust gas purifying work in the cold starting of the engine is not effectively carried out.

Because of branching of the bypass passage from the downstream position of the exhaust manifold, the exhaust manifold that has a marked thermal capacity causes the temperature of the exhaust gas led into the bypass passage to be lowered, which obstructs the earlier exhaust gas purifying work of the auxiliary catalytic converter.

Furthermore, since the modernized exhaust manifolds are designed and constructed to avoid or at least minimize an exhaust interference, it is difficult to shorten the distance to the auxiliary catalytic converter from the inlet of the bypass passage. That is, in case of an exhaust manifold for in-line four cylinder engines, a so-called "4-2-1" connection type is currently employed wherein branches for #1 and #4 cylinders form one unit and braches for #2 and #3 cylinders form the other unit, and these two units are united at an outlet portion of the manifold. As is easily known, in this type exhaust manifold, it is difficult to reduce the overall length. The above-mentioned "4-2-1" connection type tends to have a complicated construction of the manifold, which increases the thermal capacity of the same.

Furthermore, it has been difficult to operate the switch valve accurately. Actually, even when the switch valve is controlled to take the bypass position, part of the exhaust gas is led to the main passage due to a poor sealing of the switch valve to the main passage. Of course, in such case, the early activation of the auxiliary catalytic converter is adversely affected by a certain degree that corresponds to the amount of the exhaust gas led to the main passage. This undesired phenomenon becomes much severe when the pulsation of the exhaust gas is marked.

It is therefore a main object of the present invention to provide an exhaust system of a multi-cylinder internal combustion engine, which is free of the above-mentioned drawbacks.

In accordance with a first aspect of the present invention, there is provided an exhaust system of an internal combustion engine having at least one cylinder, which comprises a main exhaust passage connected to the cylinder; a main catalytic converter disposed in the main exhaust passage; a bypass exhaust passage that diverges from the main exhaust passage, the bypass exhaust passage having a gas flow resistance larger than that of the main exhaust passage and having a downstream end connected to the main exhaust passage at a position upstream of the main catalytic converter; an auxiliary catalytic converter disposed in the bypass exhaust passage; and a gas flow switching device that is capable of forcing exhaust gas from the cylinder of the engine to flow toward the bypass exhaust passage when assuming a given operation position.

In accordance with a second aspect of the present invention, there is provided an exhaust system of an in-line four cylinder internal combustion engine, which comprises first, second, third and fourth upstream main exhaust passages extending from first, second, third and fourth cylinders of the engine, the first and fourth cylinders being those whose firing order is not successive and the second and third cylinders being those whose firing order is not successive; a first intermediate main exhaust passage that is provided by joining downstream ends of the first and fourth upstream main exhaust passages; a second intermediate main exhaust passage that is provided by joining downstream ends of the second and third upstream main exhaust passages; a downstream main exhaust passage that is provided by joining downstream ends of the first and second intermediate main exhaust passages; a main catalytic converter mounted in the downstream main exhaust passage; first and second upstream bypass exhaust passages respectively extending from upstream portions of the first and second upstream main exhaust passages; third and fourth upstream bypass exhaust passages respectively extending from upstream portions of the third and fourth upstream main exhaust passages; a first intermediate bypass exhaust passage that is provided by jointing downstream ends of the first and second upstream bypass exhaust passages; a second intermediate bypass exhaust passage that is provided by joining downstream ends of the third and fourth upstream bypass exhaust passages; a downstream bypass exhaust passage that is provided by joining downstream ends of the first and second intermediate bypass exhaust passages, the downstream bypass exhaust passage having a downstream end connected to the downstream main exhaust passage at a position upstream of the main catalytic converter; and an auxiliary catalytic converter mounted in the downstream bypass exhaust passage.

In accordance with a third aspect of the present invention, there is provided an exhaust system of an in-line four cylinder internal combustion engine, which comprises first, second, third and fourth upstream main exhaust passages extending from first, second, third and fourth cylinders of the engine, the first and fourth cylinders being those whose firing order is not successive and the second and third cylinders being those whose firing order is not successive; a first intermediate main exhaust passage that is provided by joining downstream ends of the first and fourth upstream main exhaust passages; a second intermediate main exhaust passage that is provided by joining downstream ends of the second and third upstream main exhaust passages; a downstream main exhaust passage that is provided by joining downstream ends of the first and second intermediate main exhaust passages; a main catalytic converter mounted in the downstream main exhaust passage; first and second upstream bypass exhaust passages respectively extending from upstream portions of the first and second upstream main exhaust passages; third and fourth upstream bypass exhaust passages respectively extending from upstream portions of the third and fourth upstream main exhaust passages; a first intermediate bypass exhaust passage that is provided by jointing downstream ends of the first and second upstream bypass exhaust passages; a second intermediate bypass exhaust passage that is provided by joining downstream ends of the third and fourth upstream bypass exhaust passages; a downstream bypass exhaust passage that is provided by joining downstream ends of the first and second intermediate bypass exhaust passages, the downstream bypass exhaust passage having a downstream end connected to the downstream main exhaust passage at a position upstream of the main catalytic converter; an auxiliary catalytic converter mounted in the downstream bypass exhaust passage; and switch valves respectively mounted in the first, second, third and fourth upstream main exhaust passages.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, various embodiments of the present invention will be described in detail with reference to the accompanying drawings.

For ease of understanding, various directional terms, such as, right, left, upper, lower, rightward and the like are used in the following description. However, these terms are to be understood with respect to only a drawing or drawings on which the corresponding part or portion is shown.

Figure 1:
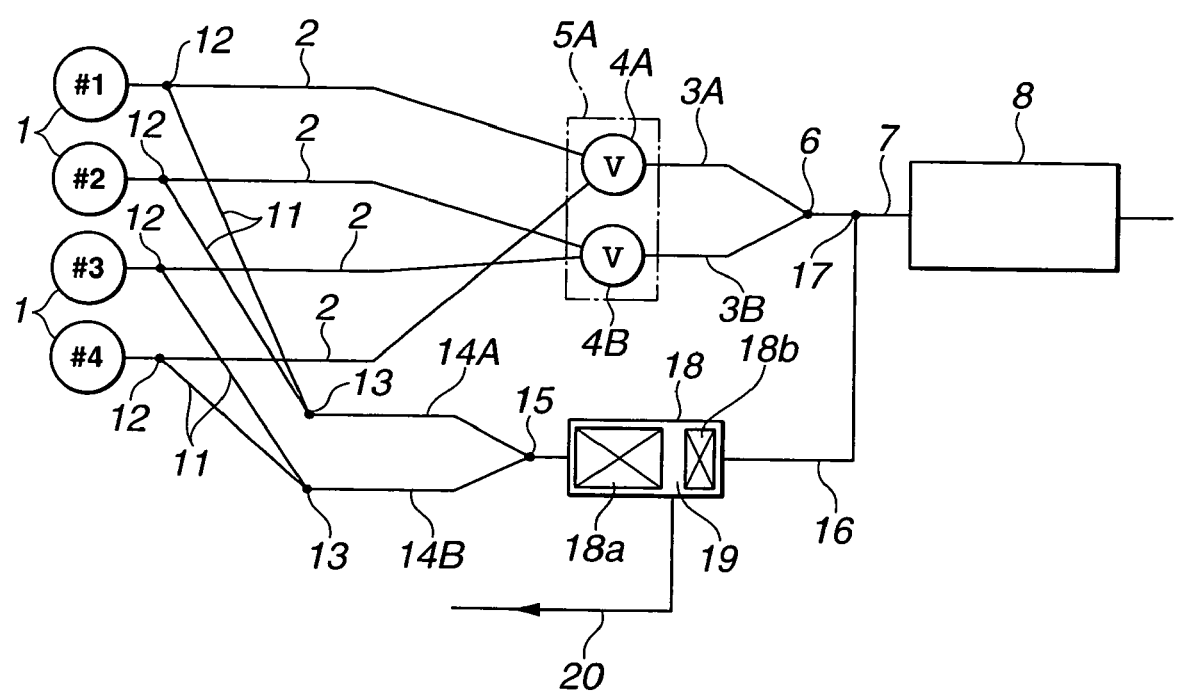
FIG. 1 is a conceptual drawing showing an exhaust system of a first embodiment of the present invention.

Referring to FIG. 1, there is shown a conceptual drawing of an exhaust system 100 of a first embodiment of the present invention. In this embodiment, an in-line four-cylinder internal combustion engine is employed for embodying the invention.

Four cylinders 1, viz., #1, #2, #3 and #4 are aligned in a cylinder block of the engine. From each cylinder 1, there extends an upstream main exhaust passage 2.

It is to be noted that upstream main exhaust passage 2 is a passage that extends from an exhaust valve (not shown) of the engine to a downstream part where an after-mentioned junction portion with the other upstream main exhaust passage 2 is provided.

As shown, upstream main exhaust passages 2 from cylinders #1 and #4 whose firing order is not successive are joined by a first intermediate main exhaust passage 3A, and upstream main exhaust passages 2 from cylinders #2 and #3 whose firing order is not successive are joined by a second intermediate main exhaust passage 3B.

In each of the joined portions, there is installed a switch valve 4A or 4B. As will be described in detail hereinafter, switch valves 4A and 4B are controlled by a single actuator.

That is, when the engine is in a condition just after cold staring, switch valves 4A and 4B are controlled by the actuator to take their closed position blocking a fluid communication between each main exhaust passage 2 and corresponding intermediate main exhaust passage 3A or 3B, and at the same time, blocking a fluid communication between the two upstream main exhaust passages 2 which are joined.

As will be described in detail hereinafter, the two switch valves 4A and 4B constitute a switch valve unit 5A (see FIGS. 2 and 5).

As is seen from FIG. 1, first and second intermediate main exhaust passages 3A and 3B extending from switch valve unit 5 are joined at a junction portion 6 and a downstream main exhaust passage 7 extends downstream from the junction portion 6.

In downstream main exhaust passage 7, there is installed a main catalytic converter 8 that includes a three-way catalyst and a HC (hydrocarbon) trapping catalyst. This main catalytic converter 8 is arranged beneath a vehicle floor and has a sufficient capacity.

Thus, the four upstream main exhaust passages 2, the two intermediate main exhaust passages 3A and 3B, the downstream main exhaust passage 7 and the main catalytic converter 8 constitute a main exhaust passage structure through which the exhaust gas from the engine is permitted to flow in a normal operation condition of the engine. That is, in such normal operation condition, the "4-2-1" connection type passage arrangement of the exhaust system is defined, and thus, the charging efficiency of the cylinders is increased with the aid of the exhaust dynamic effect.

As is seen from FIG. 1, from a branched portion 12 of each upstream main exhaust passage 2, there extends an upstream bypass exhaust passage 11.

It is to be noted that the branched portion 12 is provided in the passage 2 as upstream as possible. More specifically, the branched portion 12 should be provided at least in a range that is upstream to a ½ point of the entire length of upstream main exhaust passage 2.

Each upstream bypass exhaust passage 11 has a cross-sectional area that is sufficiently smaller than that of the corresponding upstream main exhaust passage 2.

As shown, upstream bypass exhaust passages 11 from the main exhaust passages 2 from cylinders #1 and #2 are united at a junction portion 13, and a first intermediate bypass exhaust passage 14A extends downstream from the junction portion 13. Similarly, upstream bypass exhaust passages 11 from the main exhaust passages 2 from cylinders #3 and #4 are joined at a junction portion 13, and a second intermediate bypass exhaust passage 14B extends downstream from the junction portion 13. Each bypass exhaust passage 11 is made as short as possible.

As shown, the two intermediate bypass exhaust passages 14A and 14B are united at a junction portion 15, and a downstream bypass exhaust passage 16 extends downstream from junction portion 15. The downstream bypass exhaust passage 16 is led to a junction portion 17 provided on the downstream main exhaust passage 7 at a position upstream of main catalytic converter 8, as shown.

In downstream bypass exhaust passage 16, there is installed an auxiliary catalytic converter 18 that includes a three-way catalyst. This auxiliary catalytic converter 18 is arranged in the bypass exhaust passage as upstream as possible. In other words, the length of each bypass exhaust passage between branched portion 12 and junction portion 15 should be made as short as possible.

If desired, the four upstream bypass exhaust passages 11 may be joined at a position just upstream of auxiliary catalytic converter 18 without the aid of the above-mentioned two intermediate bypass exhaust passages 14A and 14B. However, when considering a fixed positioning between each branched portion 12 and auxiliary catalytic converter 18, the above-mentioned "4-2-1" united type passage arrangement is preferable in the present invention. That is, in this type, the entire length of the passages practically used can be reduced, and thus, the piping used can have a reduced thermal capacity and a reduced heat radiation area to the atmosphere.

As shown in FIG. 1, auxiliary catalytic converter 18 comprises a first catalyst part 18a and a second catalyst part 18b which are arranged in tandem. Between these two parts 18a and 18b, there is defined a certain clearance 19 to which an inlet part of EGR (viz., exhaust gas recirculation) passage 20 is exposed. Although not shown in the drawing, an outlet part of this EGR passage 20 is exposed to a part of an air intake system of the engine through an EGR control valve. That is, during operation of the engine, part of the exhaust gas is picked up from the clearance 19 and led to the air intake system.

It is to be noted that auxiliary catalytic converter 18 has a small capacity as compared with main catalytic converter 8, and is of a type that can exhibits a sufficient activation even in a relatively cold condition.

When, in operation, the engine is in a condition just after a cold staring, that is, when the temperature of the exhaust gas from the engine is not sufficiently high, the actuator (not shown) causes the two switch valves 4A and 4B to take a closed position, thereby blocking the main exhaust passage. Under this condition, the exhaust gas from the engine is entirely led to the four upstream bypass exhaust passages 11 from the branched portions 12 and then led to auxiliary catalytic converter 18 through the two intermediate bypass exhaust passages 14A and 14B.

Since auxiliary catalytic converter 18 is positioned at the upstream side of the exhaust system, that is, near the cylinders #1, #2, #3 and #4, and a smaller capacity, the converter 18 is heated quickly and thus activated quickly, and thus a sufficient exhaust purifying operation of the auxiliary catalytic converter 18 can start early.

Because, under this condition, each switch valve 4A or 4B isolates the paired upstream main exhaust passages 2, undesired exhaust gas temperature reduction, that would be caused by a reciprocating movement of the exhaust gas between the paired upstream main exhaust passages 2 through the switch valve 4A or 4B, is suppressed or at least minimized. This promotes the quick activation of the auxiliary catalytic converter 18.

Furthermore, since, under this condition, the exhaust gas led into EGR passage 20 is the gas that has been purified or cleaned by first catalyst part 18a of the auxiliary converter 18, the EGR system, particularly, the EGR gas control valve of the same can be protected from solid deposit and contamination.

While, when, due to continuous operation of the engine, the exhaust gas from the engine shows a sufficiently high temperature, the actuator causes the two switch valves 4A and 4B to take an open position, thereby establishing an open condition of the main exhaust passage.

With this, the exhaust gas from the engine is mainly led into the four upstream main exhaust passages 2 and into the main catalytic converter 8 through the paired intermediate main exhaust passages 3A and 3B. Because each upstream bypass exhaust passage 11 has a cross-sectional area that is smaller than that of the corresponding upstream main exhaust passage 2, and because of presence of the auxiliary catalytic converter 18 in the bypass exhaust system, almost all of the exhaust gas from the engine is forced to flow in the main exhaust system. Thus, in this case, the auxiliary catalytic converter 18 is free of a thermal degradation. Furthermore, since the bypass exhaust passage is opened but in a small degree, a part of the exhaust gas is permitted to enter the bypass exhaust passage when, under a high speed and high load operation condition, a larger amount of exhaust gas is produced by the engine. This prevents lowering of charging efficiency of the cylinders caused by a back pressure.

As is described hereinabove, the main exhaust passage system is in the form of "4-2-1" united type arrangement, and thus, increase in the charging efficiency of the cylinders is achieved with the aid of the exhaust dynamic effect.

While, the bypass exhaust passage system is arranged in the above-mentioned manner without taking the exhaust interference avoidance into a consideration. However, since each upstream bypass exhaust passage 11 used has a sufficiently smaller cross-sectional area, the exhaust interference inevitably induced by a communication with the corresponding cylinder can be reduced to a very small degree. If the cross-sectional area of upstream bypass exhaust passage 11 is made larger than a predetermined high degree, a marked lowering of the charting efficiency would take place due to the exhaust interference. While, if the cross-sectional area is made smaller than a predetermined low degree, the amount of exhaust gas during the time when switch valves 4A and 4B are kept in their closed position is excessively reduced, and thus, the operation range in which the bypass exhaust system can be practically operated is excessively reduced.

Thus, actually, the cross-sectional area of upstream bypass exhaust passage 11 should have a range that varies in accordance with an engine displacement. Examination has revealed that when the engine has a displacement of 2000 cc, a sufficient performance is obtained from the bypass exhaust system with an inner diameter of upstream bypass exhaust passage 11 that ranges from 5 mm to 15 mm.

If operation of the EGR system is carried out under the open position of switch valves 4A and 4B, the exhaust gas for the recirculation is picked up from auxiliary catalytic converter 18. If, under this EGR operation, a part of the exhaust gas flowing in downstream main exhaust passage 7 flows backward in downstream bypass exhaust passage 16, the exhaust gas in the passage 16 is forced to pass through second catalyst part 18b of the converter 18, and thus, the exhaust gas used for the EGR system is not contaminated and thus, the EGR system, particularly, the EGR gas control valve is protected from solid deposit and contamination. The exhaust gas flowing backward in downward bypass exhaust passage 16 is relatively slow in flow speed, and thus, the exhaust gas can stay in second catalyst part 18b for a sufficient time. Thus, second catalyst part 18b may have a size or length smaller or shorter than first catalyst part 18a, as shown.

In the following, detailed explanation on the exhaust system 100 of the first embodiment will be made with reference to FIG. 2.

In the drawing, denoted by numeral 31 is an internal combustion engine, which comprises a cylinder block 32 and a cylinder head 33 mounted on cylinder block 32. The engine 31 is transversely mounted in an engine room of a motor vehicle. In the drawing, a right side of engine 31 faces rearward of the vehicle, and thus, the right side will be referred to a back side in the following description.

An exhaust manifold 34 is mounted to the back side of cylinder head 33, that defines therein the above-mentioned four upstream main exhaust passages 2. To a rear end of exhaust manifold 34, there is mounted the switch valve unit 5A that is equipped with the two switch valves 4A and 4B. Extending downstream from switch valve unit 5A is a front exhaust tube 35 that constitutes the above-mentioned downstream main exhaust passage 7. An upstream portion of front exhaust tube 35 has therein two parallel passages that constitute the above-mentioned intermediate main exhaust passages 3A and 3B. Main catalytic converter 8 is mounted on the front exhaust tube 35 at a position downstream of the parallel passages 3A and 3B.

Figure 2:
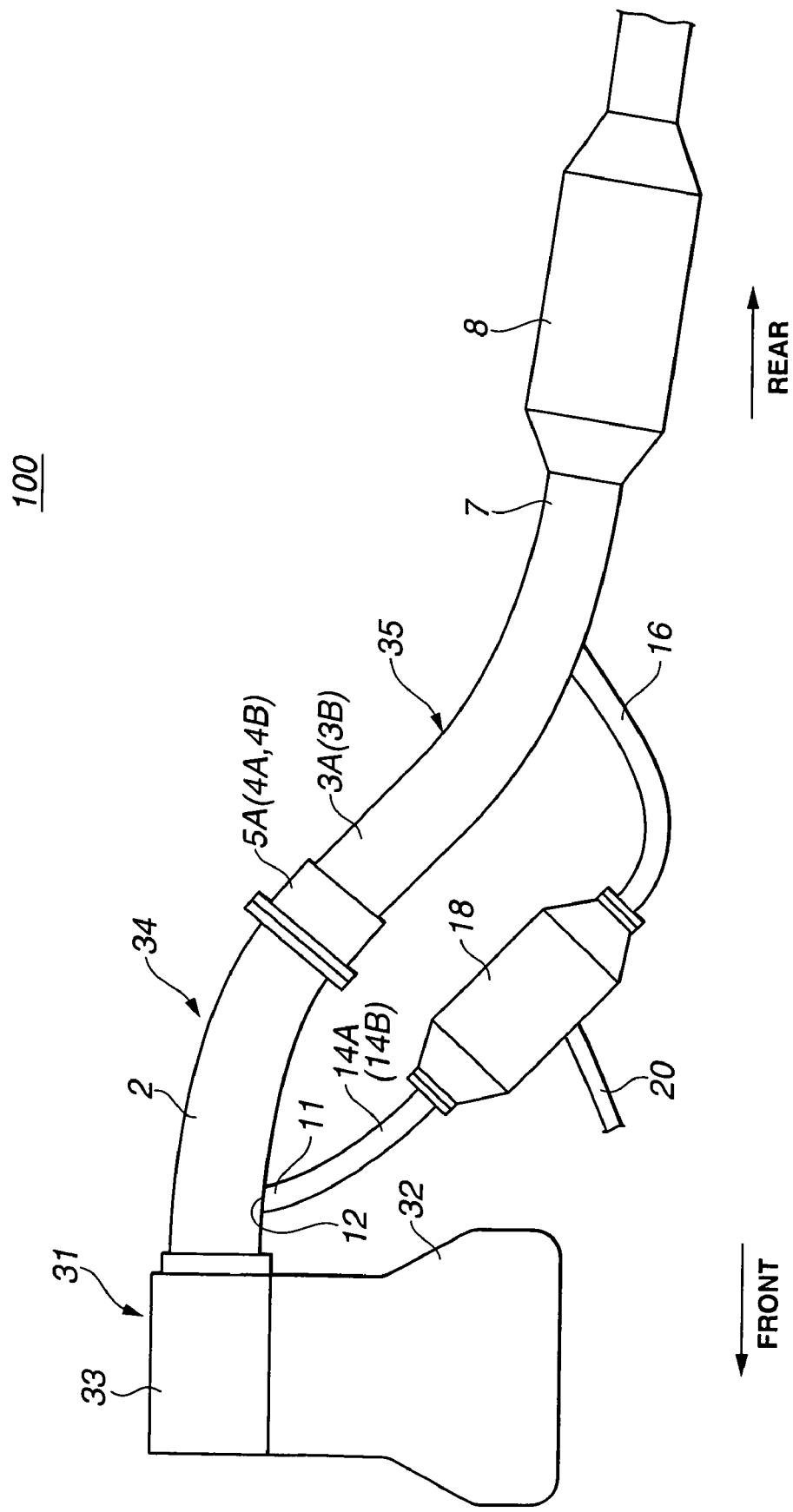
FIG. 2 is a side view of the exhaust system of the first embodiment.

As shown in FIG. 2, auxiliary catalytic converter 18 and its associated parts 11, 14A, 14B, 16 and 20 are arranged below the main exhaust system that extends rearward from cylinder head 33 of the engine 31. Auxiliary catalytic converter 18 is placed in the engine room in front of front exhaust tube 35. Thus, under running of the associated motor vehicle, auxiliary catalytic converter 18 is effectively cooled by air flow that is produced when the vehicle runs, and thus, overheating of this converter 18 is suppressed.

As shown, each upstream bypass exhaust passage 11 is branched at the branched portion 12 from the corresponding upstream main exhaust passage 2 in such a manner as to define an acute angle therebetween, which smoothes the gas flow from the main passage 2 to the bypass passage 11 at the time when switch valves 4A and 4B take their closed position. It is to be noted that downstream portions of the two bypass exhaust passages 11 are united to constitute the fist intermediate bypass exhaust passage 14A, and downstream portions of the other two bypass exhaust passages 11 are united to constitute the second intermediate bypass exhaust passage 14B.

Figure 3:
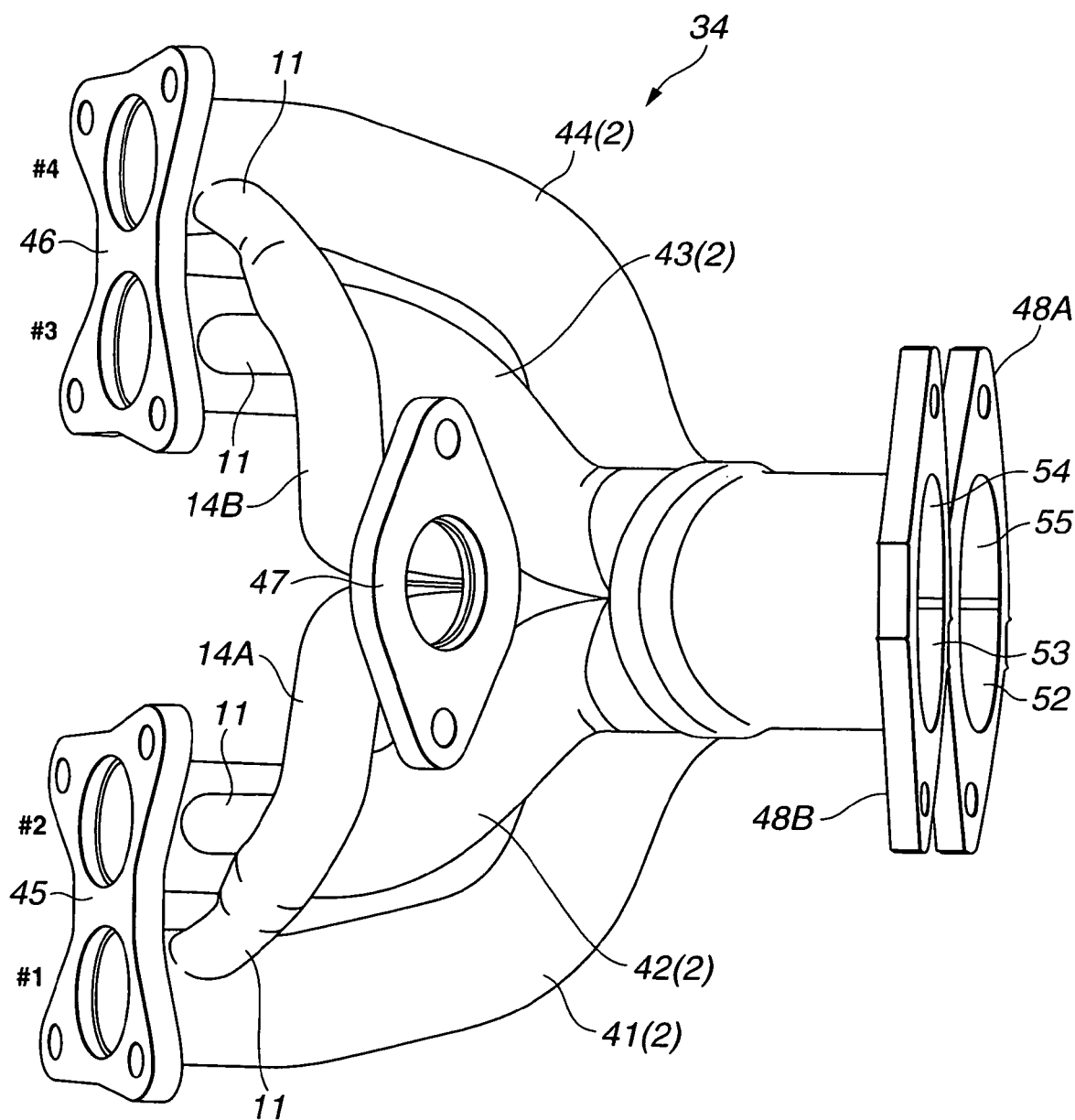
FIG. 3 is a bottom view of an exhaust manifold employed in the first embodiment.
Figure 4:
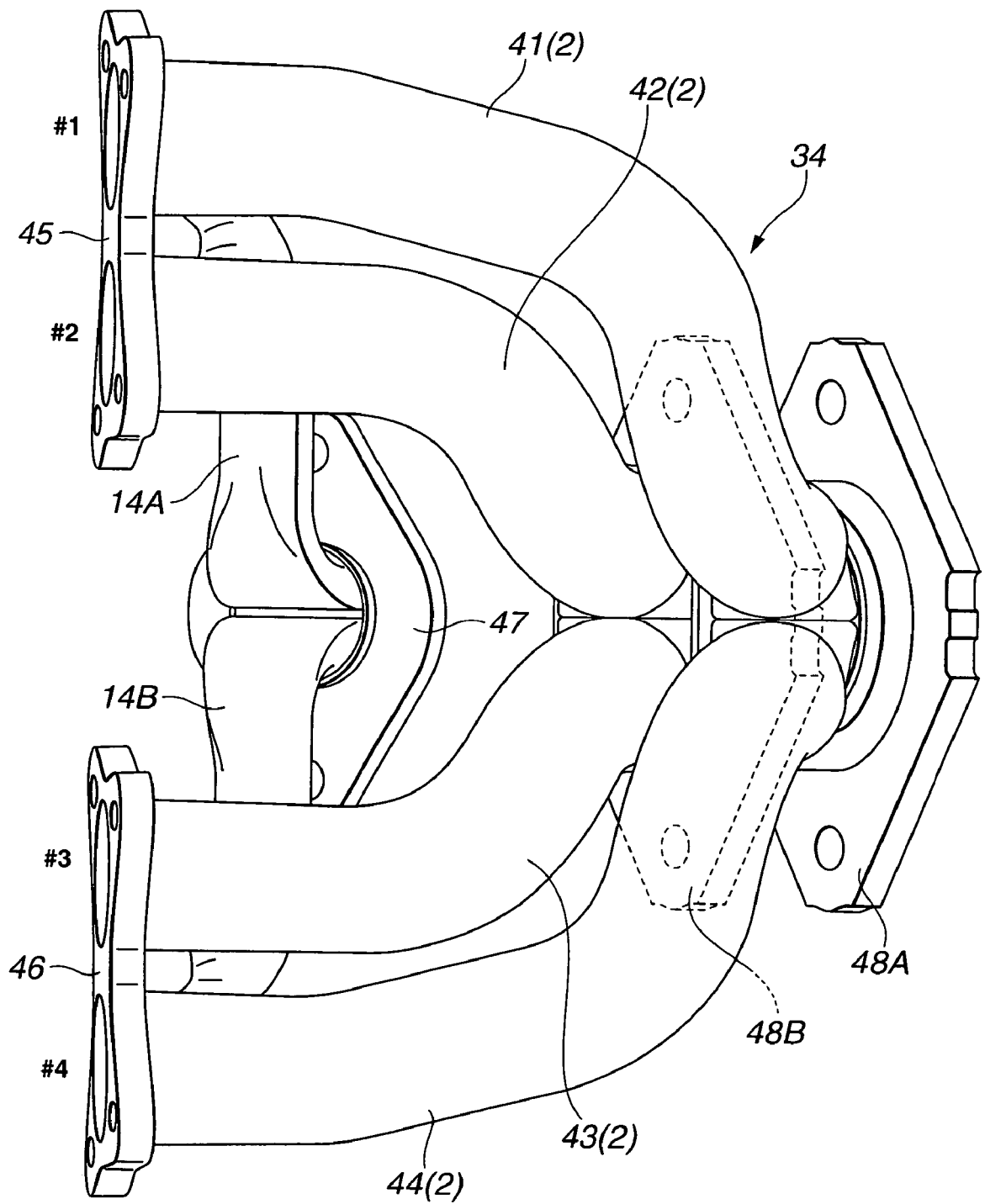
FIG. 4 is a top view of the exhaust manifold employed in the first embodiment.

The arrangement of the exhaust system 100 of the first embodiment will be much clearly understood from FIGS. 3 and 4 of the accompanying drawings.

FIG. 3 shows a bottom view of exhaust manifold 34, and FIG. 4 shows a top view of the same.

As is seen from these drawings, exhaust manifold 34 comprises four branches 41, 42, 43 and 44 that constitute upstream main exhaust passages 2 respectively, two mounting flanges 45 and 46 that are to be fixed to the cylinder head of the engine and have openings (no numerals) to which upstream ends of branches 41, 42, 43 and 44 are exposed respectively, and four bypass tubes 11 that extend from the upstream portions (12) of corresponding branches 41, 42, 43 and 44 to constitute the upstream bypass exhaust passages 11 respectively.

As shown, the two bypass tubes 11 extending from branches 41 and 42 from cylinders #1 and #2 are united at their downstream portions to constitute a united passage portion that corresponds to the first intermediate bypass passage 14A, and the other two bypass tubes 11 extending from branches 43 and 43 from cylinders #3 and #4 are united at their downstream portions to constitute another united passage portion that corresponds to the second intermediate bypass passage 14B.

These two united passage portions 14A and 14B have a mounting flange 47 that has an opening (no numeral) to which downstream ends of the passage portions 14A and 14B are exposed. Although not shown in these drawings, an inlet portion of the above-mentioned auxiliary catalytic converter 18 is secured to mounting flange 47.

As will be understood from FIGS. 3 and 4, at a downstream portion of four branches 41, 42, 43 and 44 of exhaust manifold 34, there are provided two mounting flanges 48A and 48B which are united.

As is seen from FIG. 3, mounting flange 48A has two openings to which branches 41 and 44 are connected respectively, and the other mounting flange 48B has two openings to which the other branches 42 and 43 are connected respectively. If desired, in place of using the two mounting flanges 48A and 48B, a single mounting flange may be used. In this case, the mounting flange has four isolated openings to which the four branches 41, 44, 42 and 43 are connected respectively in the above-mentioned manner.

Figure 5:
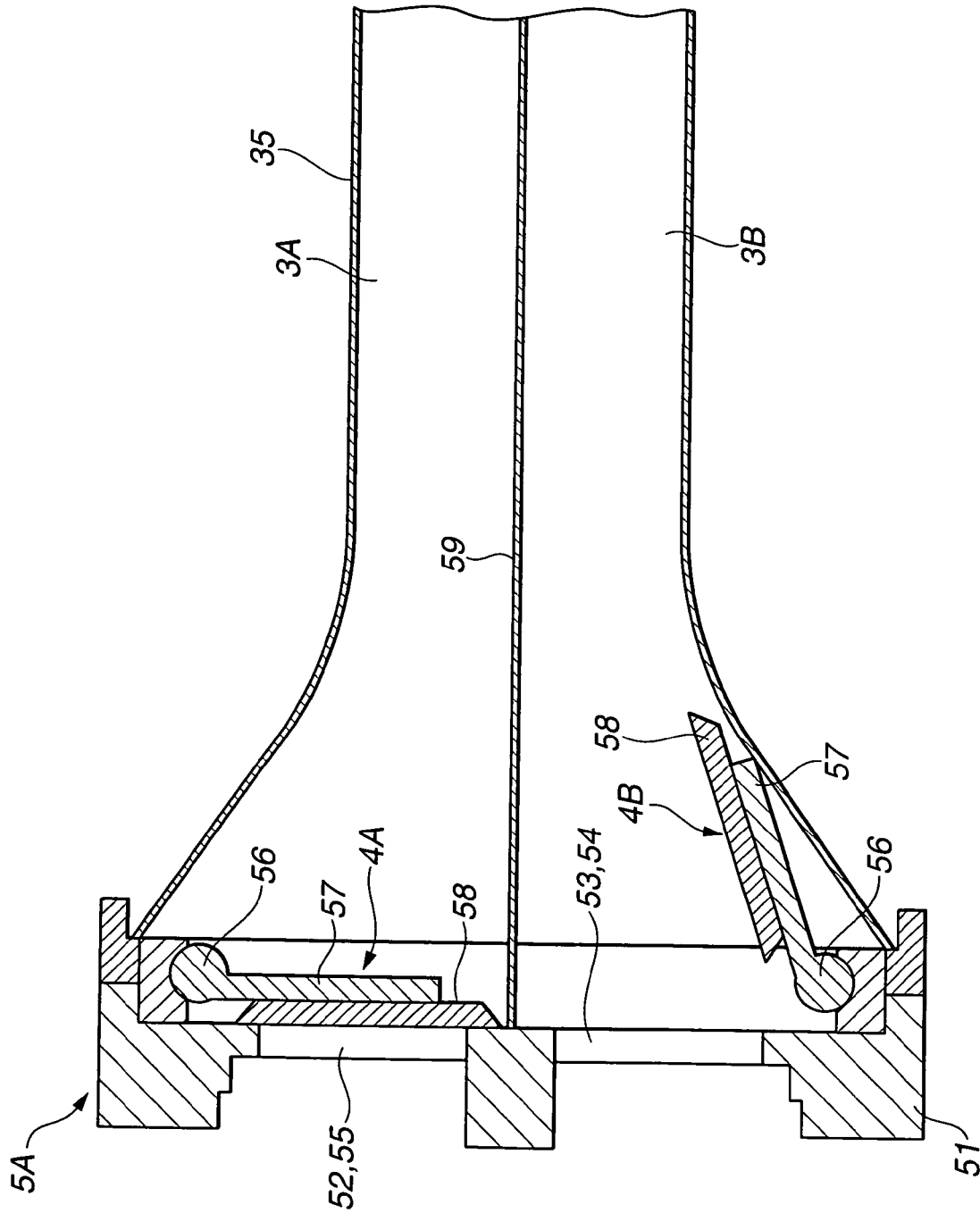
FIG. 5 is an enlarged sectional view of a switch valve unit and its nearby portion.
Figure 6:
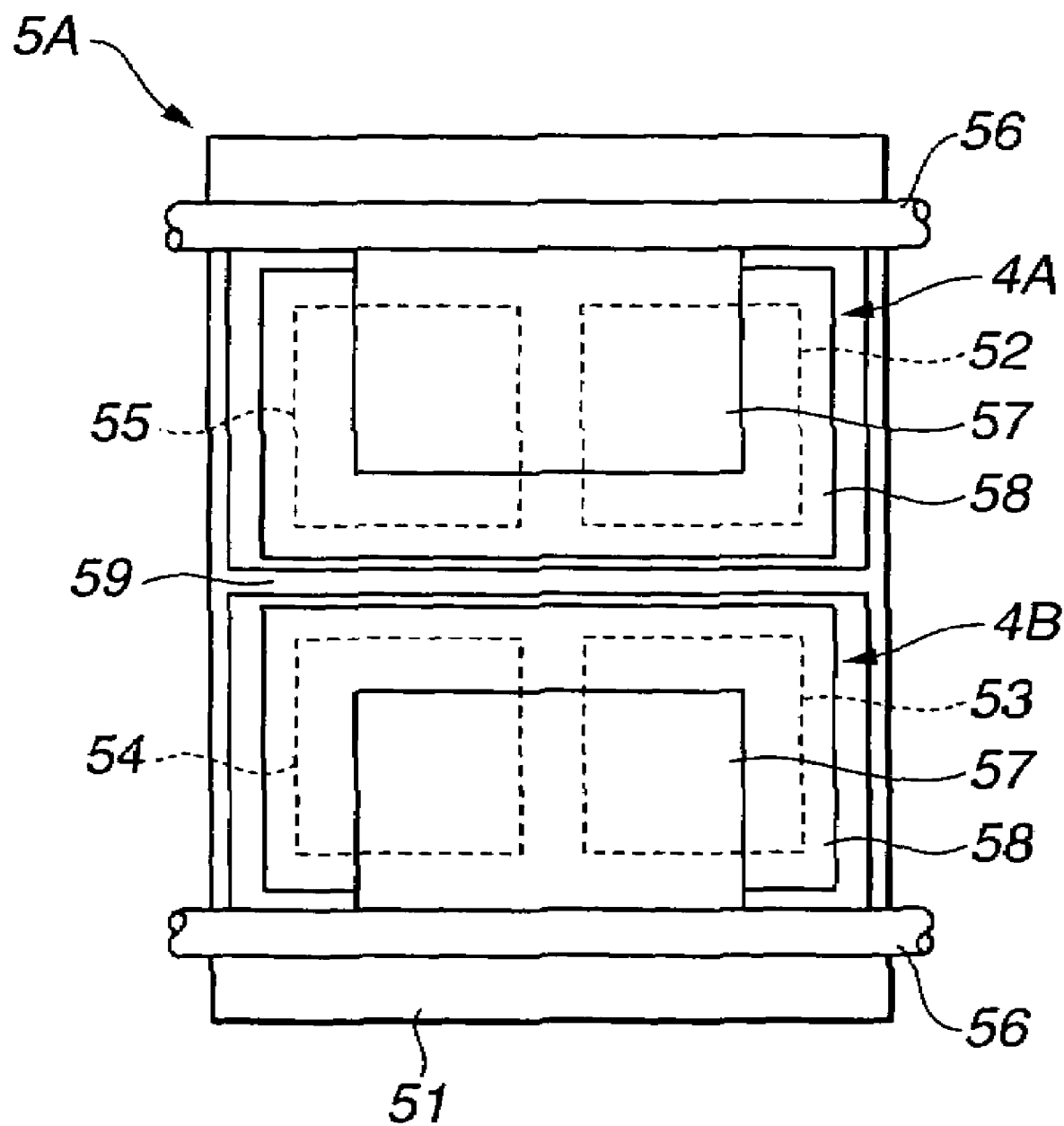
FIG. 6 is a front view of the switch valve unit.

Referring to FIGS. 5 and 6, there is shown the detail of switch valve unit 5A that is operatively connected to the two mounting flanges 48A and 48B.

As is well seen from FIG. 5, switch valve unit 5A comprises a casing 51 that has four openings, which are a first pair of openings 52 and 55 and a second pair of openings 53 and 54. Upon connection of the casing 51 with the two mounting flanges 48A and 48B, the two openings of mounting flange 48A are connected to the paired openings 52 and 55, and the two openings of the other mounting flange 48B are connected to the other paired openings 53 and 54.

As is seen from FIG. 5 and as has been mentioned hereinabove, from switch valve unit 5A, there extends the front exhaust tube 35 that has at its upstream portion two parallel passages 3A and 3B (which are the above-mentioned first and second intermediate main exhaust passages 3A and 3B) partitioned by an axially extending partition wall 59. One of the two parallel passages 3A and 3B is communicated with the paired openings 52 and 55, and the other one of the parallel passages 3A and 3B is communicated with the other paired openings 53 and 54.

Behind the paired openings 52 and 55, there is pivotally arranged a first switch valve 4A that comprises a pivot shaft 56 actuated by an after-mentioned actuator, a body holder 57 integral with pivot shaft 56 and a flat rectangular valve body 58 fitted to body holder 57. Similarly, behind the other paired openings 53 and 55, there is pivotally arranged a second switch valve 4B that also comprises a pivot shaft 56 actuated by the actuator, a body holder 57 integral with pivot shaft 56 and a flat rectangular valve body 58 fitted to body holder 57.

Thus, first switch valve 4A functions to selectively open and close the paired openings 52 and 55 at the same time, and second switch valve 4B functions to selectively open and close the other paired openings 53 and 54 at the same time. That is, first switch valve 4A functions to selectively open and close a communication between a group of cylinders #1 and #4 and one passage 3A, and second switch valve 4B functions to selectively open and close a communication between the other group of cylinders #2 and #3 and the other passage 3B, as is understood from the drawing.

When first switch valve 4A assumes the closed position, a communication between the paired openings 52 and 55 is also blocked and thus a communication between main exhaust passage 2 for cylinder #1 and main exhaust passage 2 for cylinder #4 is blocked, and when second switch valve 4B assumes the closed position, a communication between the paired openings 53 and 54 is also blocked and thus a communication between main exhaust passage 2 for cylinder #2 and main exhaust passage 2 for cylinder #3 is blocked.

When first and second switch valves 4A and 4B are opened, the exhaust gas from cylinders #1 and #4 is led into first intermediate main exhaust passage 3A, and at the same time, the exhaust gas from cylinders #2 and #3 is led into second intermediate main exhaust passage 3B.

As will be described in detail hereinafter, a link mechanism actuated by the single actuator is arranged between the respective pivot shafts 56 of first and second switch valves 4A and 4B, so that these two valves 4A and 4B assume their open and closed positions synchronously.

Figure 7:
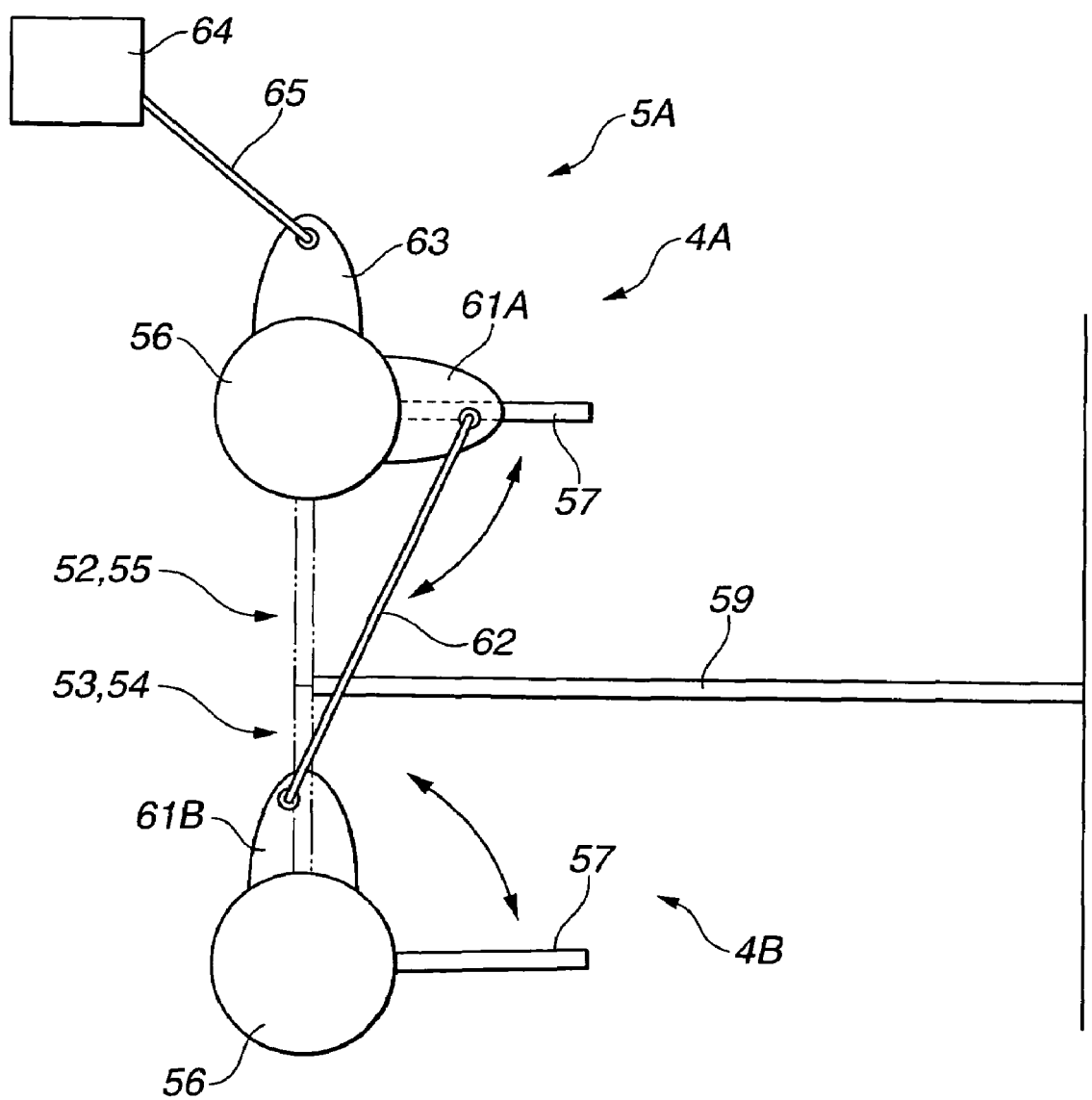
FIG. 7 is a view of a link mechanism for synchronously actuating two switch valves that constitute the switch valve unit.

FIG. 7 shows the detail of the link mechanism actuated by the single actuator 64. The link mechanism comprises a first link plate 61A fixed to pivot shaft 56 of first switch valve 4A, a second link plate 61B fixed to pivot shaft 56 of second switch valve 4B, a rod 62 having one end pivotally connected to first link plate 61A and the other end pivotally connected to second link plate 61B, and a third link plate 63 fixed to pivot shaft 56 of first switch valve 4A. As shown, first and second link plates 61A and 61B are arranged to define therebetween an angle of 90 degrees. The actuator 64 may be of a vacuum power type or an electromagnetic type, which has an output member connected to third link plate 63 through a rod 65. When the actuator 64 is energized, the output member of the same pushes rod 65. With this, pivot shaft 56 of first switch valve 4A is turned clockwise in FIG. 7 and at the same time pivot shaft 56 of second switch valve 4B is turned counterclockwise, and thus, first and second switch valves 4A and 4B assume their closed position.

Figure 8:
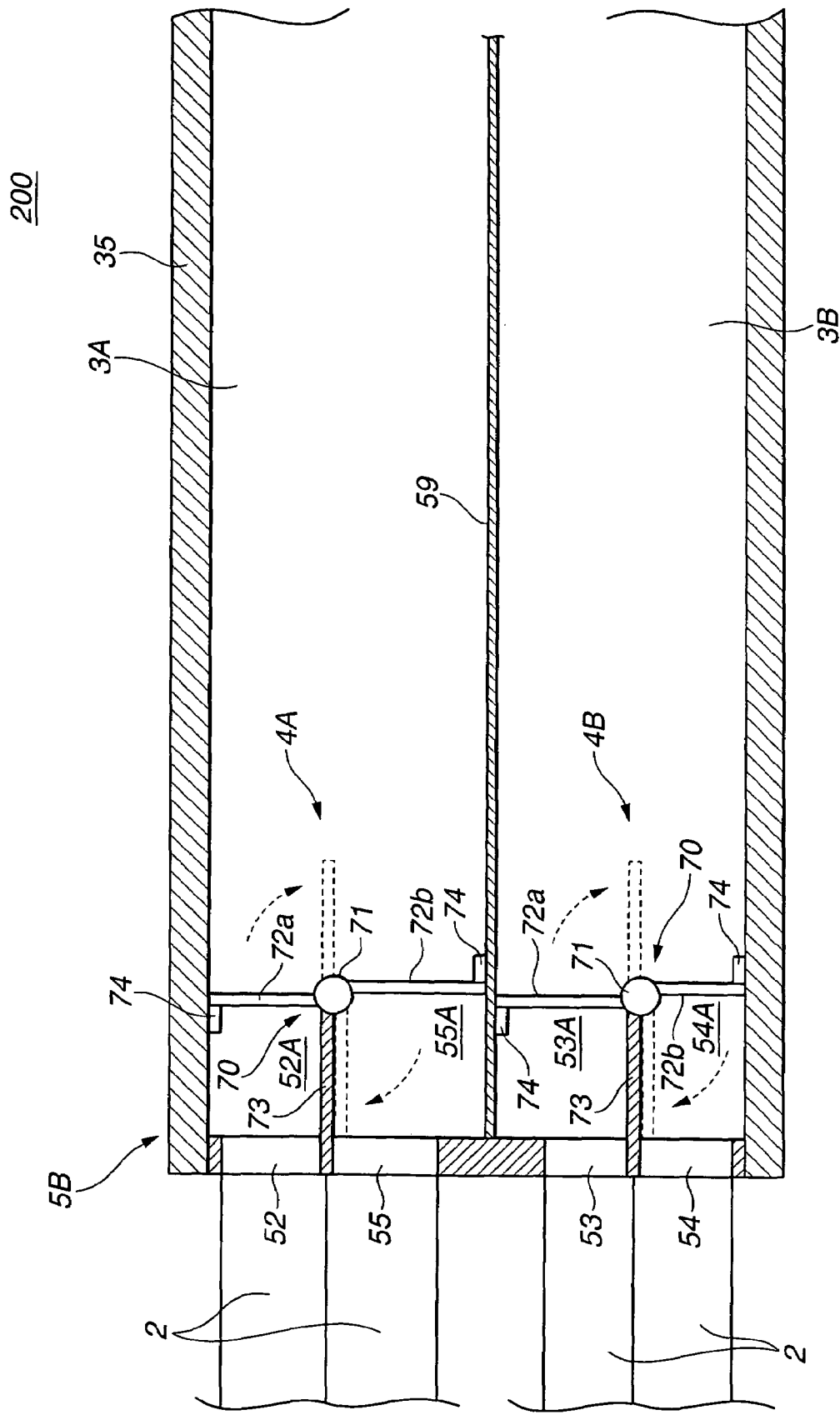
FIG. 8 is a sectional view of a switch valve unit employed in an exhaust system of a second embodiment of the present invention.

Referring to FIG. 8, there is shown a switch valve unit 5B that is installed in an exhaust system 200 of a second embodiment of the present invention. For easy understanding of this embodiment, the drawing is schematically illustrated with some illustration contradiction.

Valve unit 5B employed in this embodiment 200 has two butterfly valves 70 for the respective switch valves 4A and 4B.

Each butterfly valve 70 comprises a pivot shaft 71 that is arranged at an upstream end portion of the corresponding passage 3A or 3B. Each pivot shaft 71 has two flat valve bodies 72a and 72b that extend radially outward therefrom. As shown, flat valve bodies 72a and 72b are somewhat offset with respect to an axis of the pivot shaft 71.

A partition wall 73 extends axially in the upstream end portion of each passage 3A or 3B to a position near the corresponding pivot shaft 71, and thus the upstream end portion is divided into two passages 52A and 55A (or 53A and 54A) which are merged with openings 52 and 55 respectively (or openings 53 and 54).

Seal members 74 are secured to inner wall of each passage 3A or 3B. As shown, when switch valve 4A or 4B takes its closed position, the two flat valve bodies 72a and 72b close downstream ends of the two passages 52A and 55A (or 53A and 54A), respectively. Under this condition, each valve body 72a or 72b is in contact with the corresponding seal member 74.

That is, when first switch valve 4A assumes the closed position, the communication between each of the paired openings 52 and 55 and the passage 3A is blocked and at the same time, the communication between the paired openings 52 and 55 is also blocked. Similarly, when second switch valve 4B assumes the closed position, the communication between each of the paired openings 53 and 54 and the other passage 3B is blocked and at the same time, the communication between the paired openings 53 and 54 is blocked. Although not shown in the drawing, a link mechanism actuated by an actuator is incorporated with both pivot shafts 71 to synchronously actuate the same.

Figure 9:
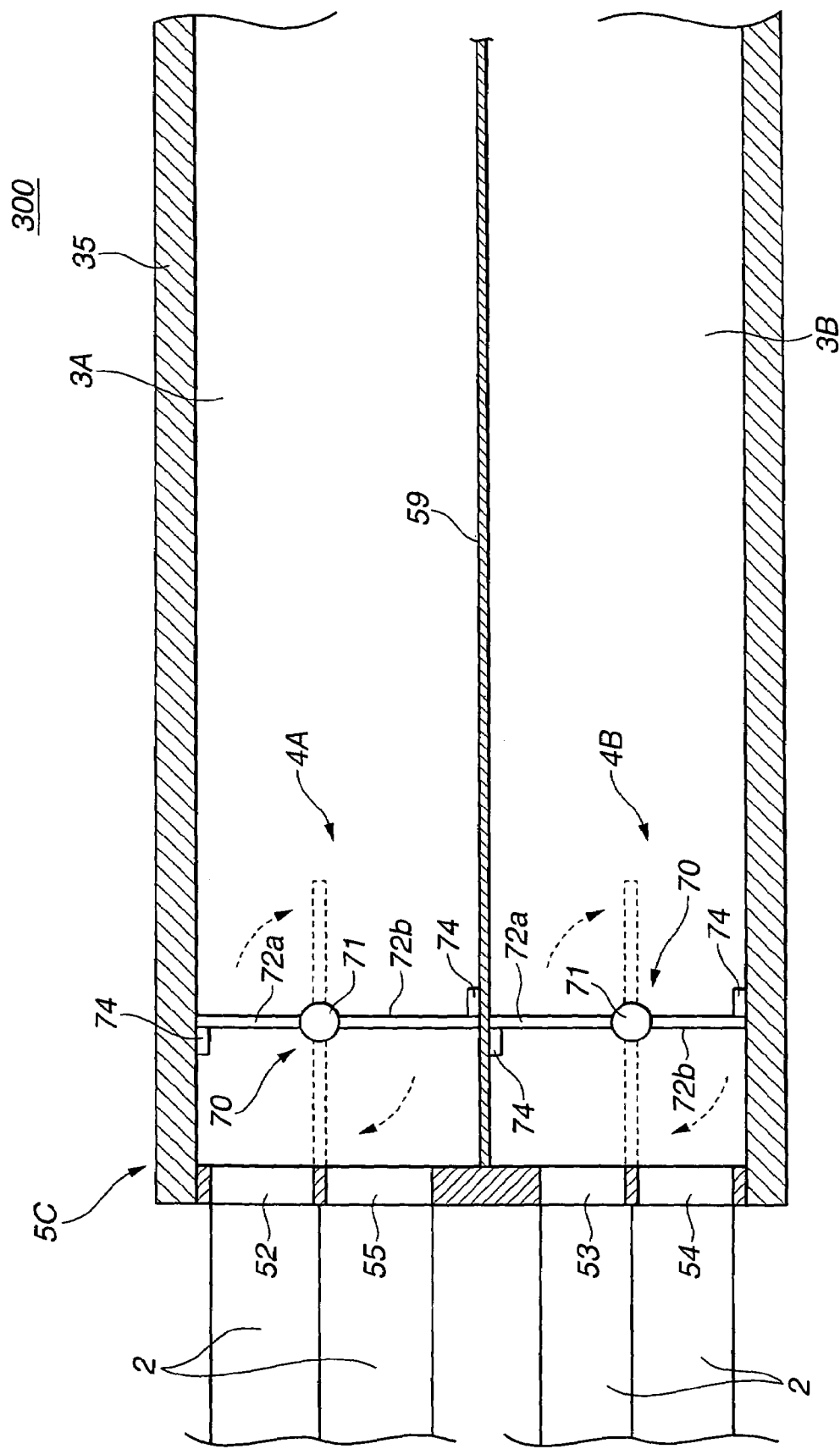
FIG. 9 is a sectional view of a switch valve unit employed in an exhaust system of a third embodiment of the present invention.

Referring to FIG. 9, there is shown a switch valve unit 5C that is installed in an exhaust system 300 of a third embodiment of the present invention. Also, this drawing is schematically illustrated with some illustration contradiction for easy understanding of the embodiment.

Valve unit 5C employed in this embodiment 300 is substantially the same as switch valve unit 5B of the above-mentioned embodiment 200, except that in this third embodiment 300, there is no means corresponding to partition walls 73 and in this third embodiment 300, two flat valve bodies 72a and 72b extend radially outward from pivot shaft 71. Thus, in this embodiment 300, even when each switch valve 4A or 4B takes the closed position as shown, the fluid communication between the paired openings 52 and 55 (or 53 and 54) is kept unlike the case of the above-mentioned first and second embodiments 100 and 200.

Figure 10:
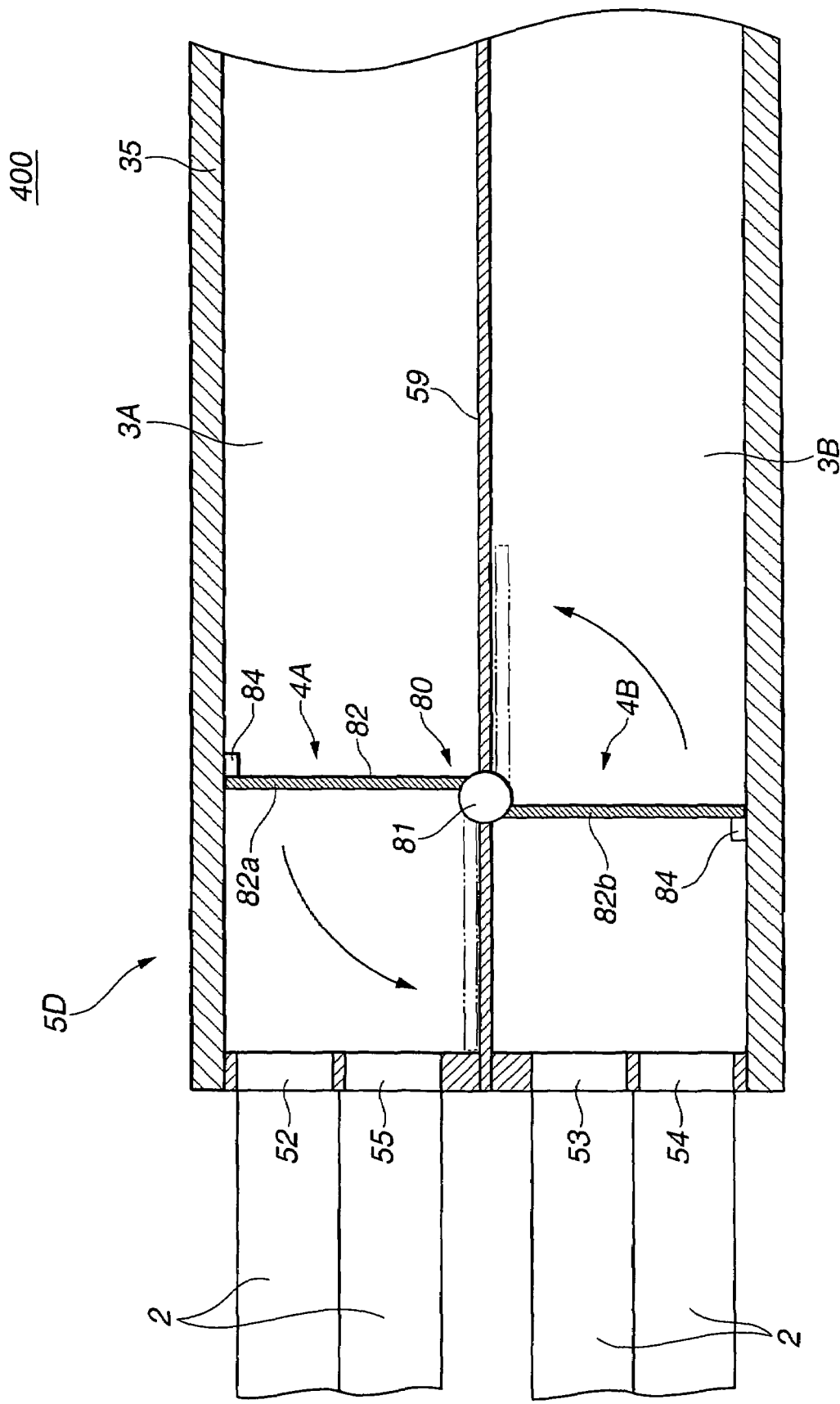
FIG. 10 is a sectional view of a switch valve unit employed in an exhaust system of a fourth embodiment of the present invention.

Referring to FIG. 10, there is shown a switch valve unit 5D that is installed in an exhaust system 400 of a fourth embodiment of the present invention. Also, this drawing is schematically illustrated with some illustration contradition for easy understanding.

Valve unit 5D employed in this embodiment 400 has only one butterfly valve 80 that serves as both switch valves 4A and 4B for controlling the fluid communication between the four upstream main exhaust passages 2 and the two intermediate main exhaust passages 3A and 3B.

Butterfly valve 80 comprises a pivot shaft 81 that is arranged at an upstream portion of the two intermediate main exhaust passages 3A and 3B. In the illustrated embodiment, pivot shaft 81 is rotatably supported by the axially extending partition wall 59. Pivot shaft 81 has two flat valve bodies 82a and 82b that extend radially outward therefrom. However, actually, flat valve bodies 82a and 82b are somewhat offset with respect to an axis of pivot shaft 81, as shown.

Seal members 84 are secured to inner walls of the passages 3A and 3B. As shown, when butterfly valve 80 takes its closed position, the outside ends of two flat valve bodies 82a and 82b are in contact with seal members 84. When turning in the direction of the arrows, butterfly valve 80 takes an open position.

As is understood from the drawing, when butterfly valve 80 takes the closed position, the fluid communication between the paired openings 52 and 55 (or 53 and 54) and first or second intermediate main exhaust passage 3A or 3B is blocked while keeping the communication between the paired openings 52 and 55, that is, the communication between the two upstream main exhaust passages 2 for cylinders #1 and #4. While, when butterfly valve 80 turns to the open position, the fluid communication between the paired openings 52 and 55 (or 53 and 54) and first or second intermediate main exhaust passage 3A or 3B becomes established.

Figure 11:
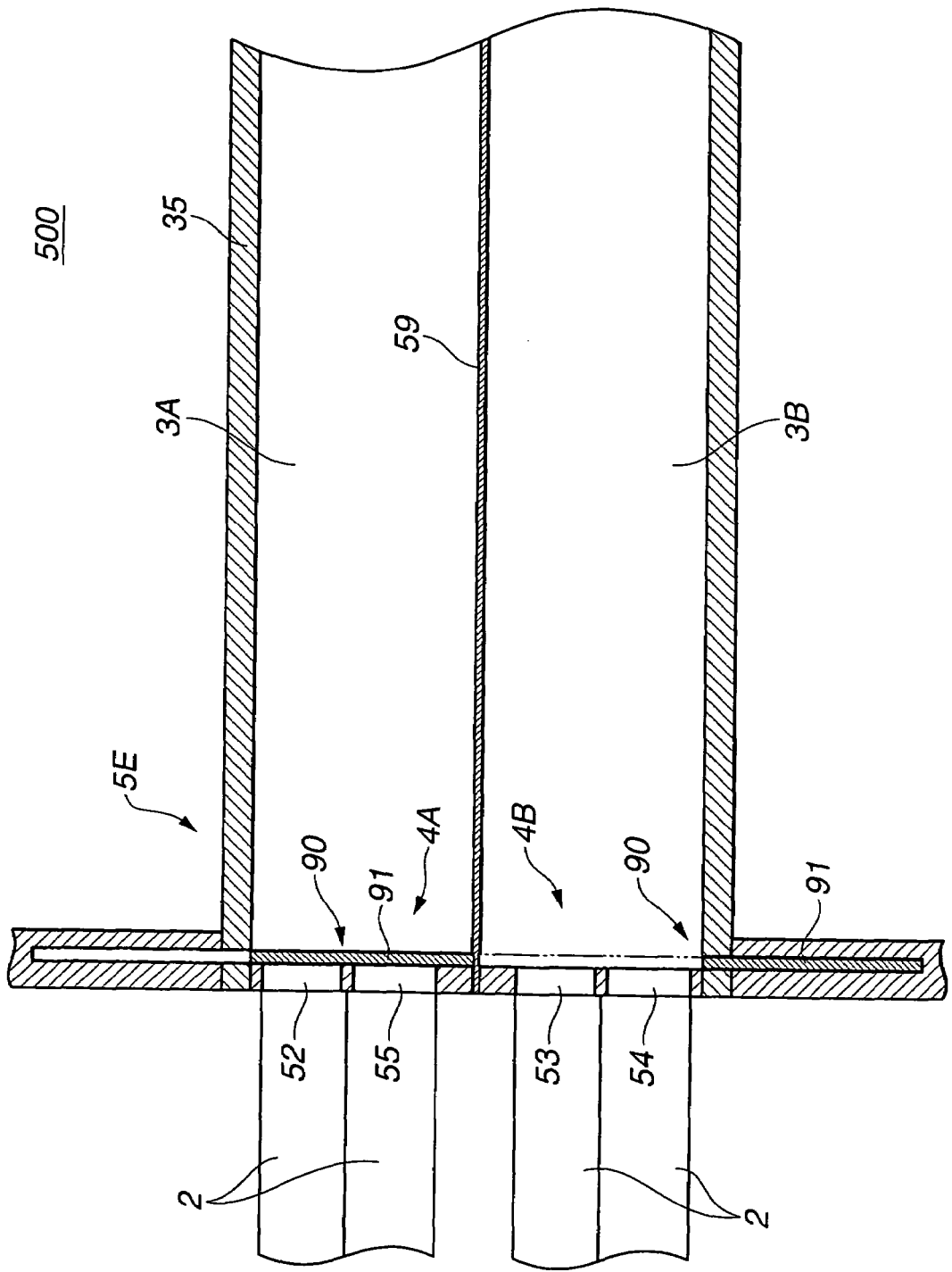
FIG. 11 is a sectional view of a switch valve unit employed in an exhaust system of a first embodiment of the present invention.

Referring to FIG. 11, there is shown a switch valve unit 5E that is employed in an exhaust system 500 of a fifth embodiment of the present invention. Like the above-mentioned drawings of FIGS. 8 to 10, the drawing of this embodiment is schematically illustrated with some illustration contraction for easy understanding.

Valve unit 5E employed in this embodiment 500 uses two slide door type valves 90 as switch valves 4A and 4B. Each slide door type valve 90 comprises a flat slide door 91 that is arranged behind the paired openings 52, 55, 53 and 54 to slide in a direction perpendicular to the axes of the intermediate main exhaust passages 3A and 3B.

Figure 12:
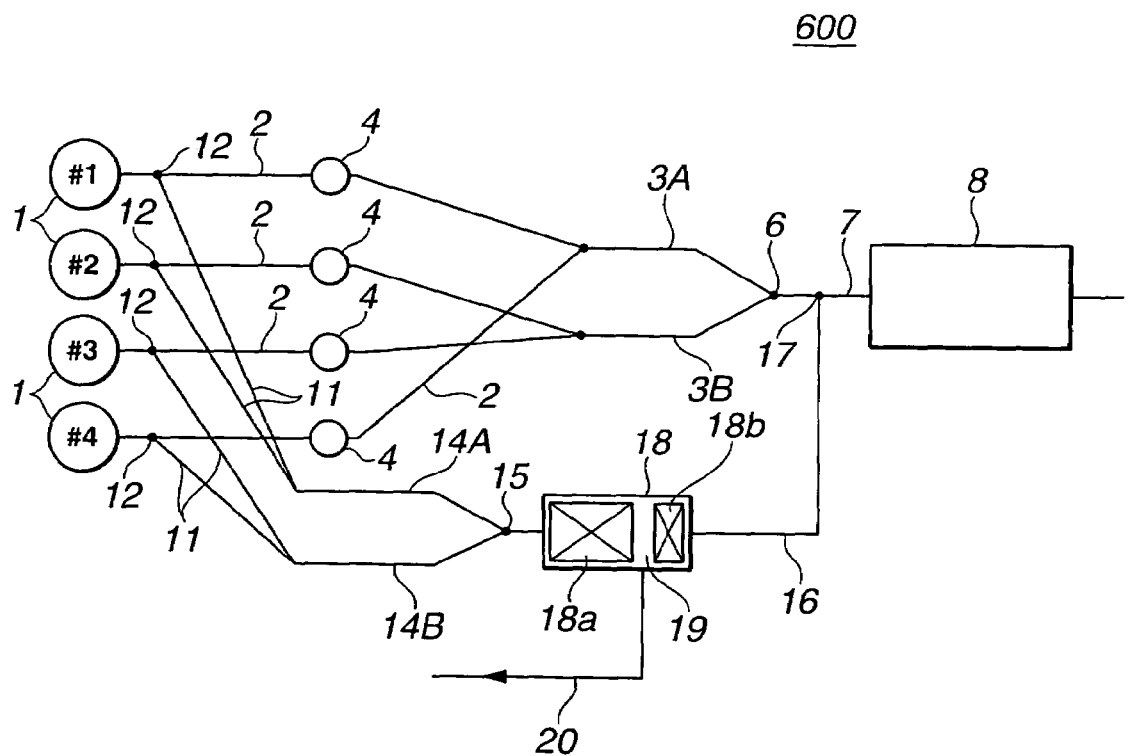
FIG. 12 is a view similar to FIG. 1, but showing an exhaust system of a sixth embodiment of the present invention.

Referring to FIG. 12, there is shown an exhaust system 600 of a sixth embodiment of the present invention.

As is seen from this drawing, exhaust system 600 of this embodiment is similar to exhaust system 100 of the above-mentioned first embodiment. Thus, only parts or portions that are different from those of the first embodiment 100 will be described in detail in the following.

In this sixth embodiment 600, a switch valve 4 is installed in each of upstream main exhaust passages 2. Each switch valve 4 is arranged in the corresponding passage 2 as upstream as possible in order that the corresponding upstream bypass exhaust passage 11 can get a higher temperature exhaust gas after the cold starting of the engine. Actually, the four branches 41, 42, 43 and 44 (or 2) (see FIGS. 3 and 4) of exhaust manifold 34 have a considerably higher thermal capacity, and thus, if the length of each branch 41, 42, 43 or 44 defined from an inlet end of the same to the corresponding switch valve 4 is large, the exhaust gas led to the corresponding bypass exhaust passage 11 is subjected to a marked temperature drop, which is undesirable to auxiliary catalytic converter 18.

Figure 13:
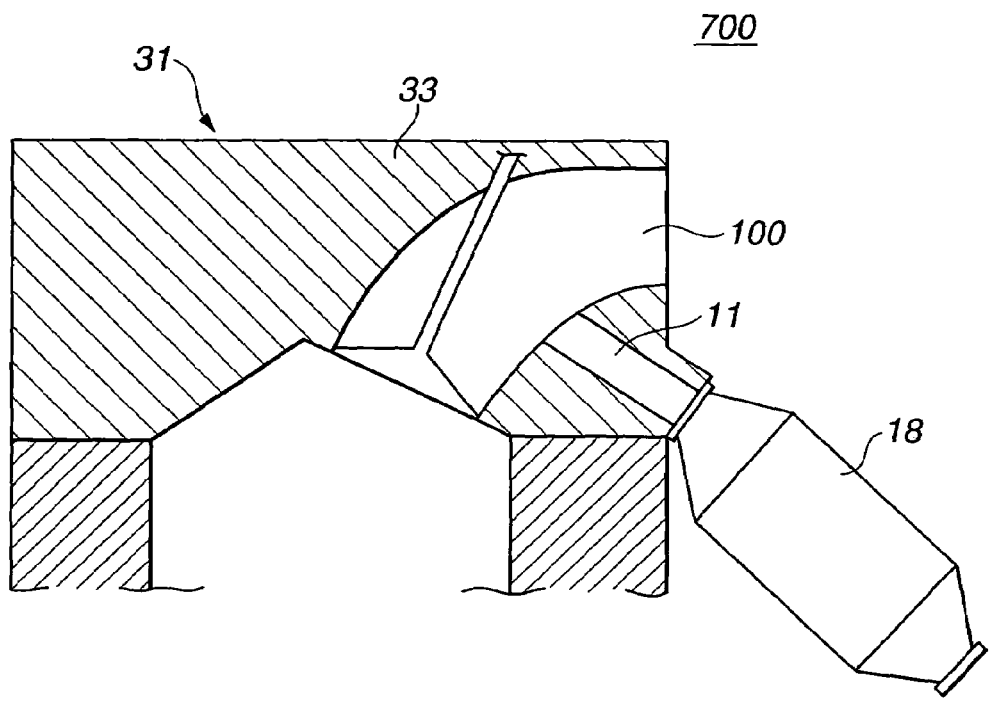
FIG. 13 is a sectional view of an essential portion of an exhaust system of a seventh embodiment of the present invention, in which an auxiliary catalytic converter is directly connected to a cylinder head of an engine.
Figure 14:
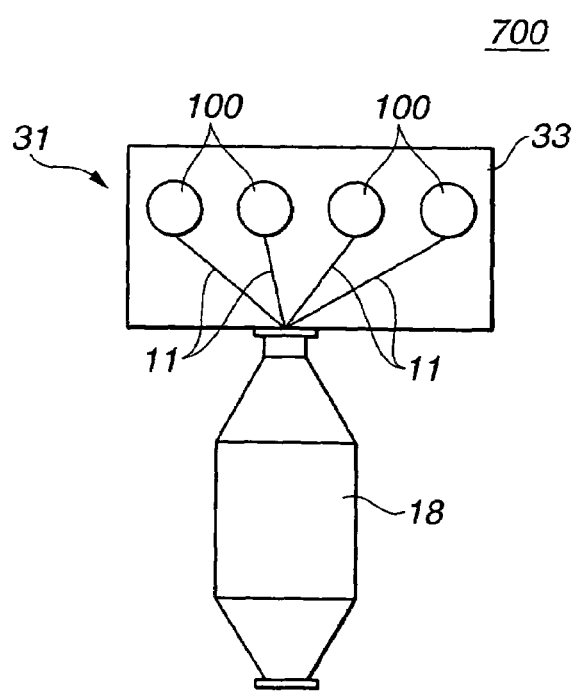
FIG. 14 is a conceptional drawing showing an exhaust system of a seventh embodiment of the present invention.

Referring to FIGS. 13 and 14, there is schematically shown an exhaust system 700 of a seventh embodiment of the present invention. In this embodiment 700, auxiliary catalytic converter 18 is directly connected to cylinder head 33 of the engine 31 in order to shorten the length of the four bypass exhaust passages 11. As shown, in this case, four bypass exhaust passages 11 are defined in cylinder head 33, and each bypass exhaust passage 11 is branched from the corresponding exhaust port 100 that constitutes part of upstream main exhaust passage 2.

As is seen from FIG. 14, four bypass exhaust passages 11 are joined at their downstream ends and directly connected to the inlet of auxiliary catalytic converter 18. In this case, a much higher temperature exhaust gas can be led to the converter 18 even just after cold staring of the engine 31.

Figure 15:
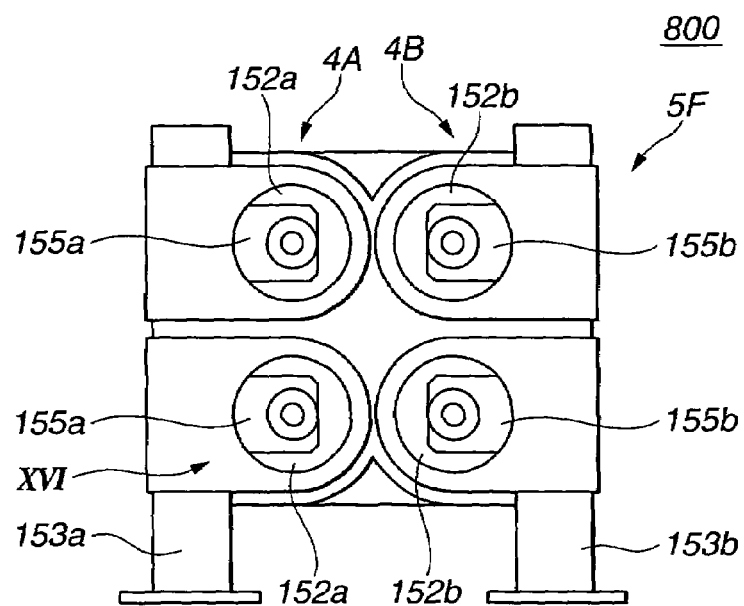
FIG. 15 is a plan view of a switch valve unit installed in an exhaust system of an eighth embodiment of the present invention.
Figure 16:
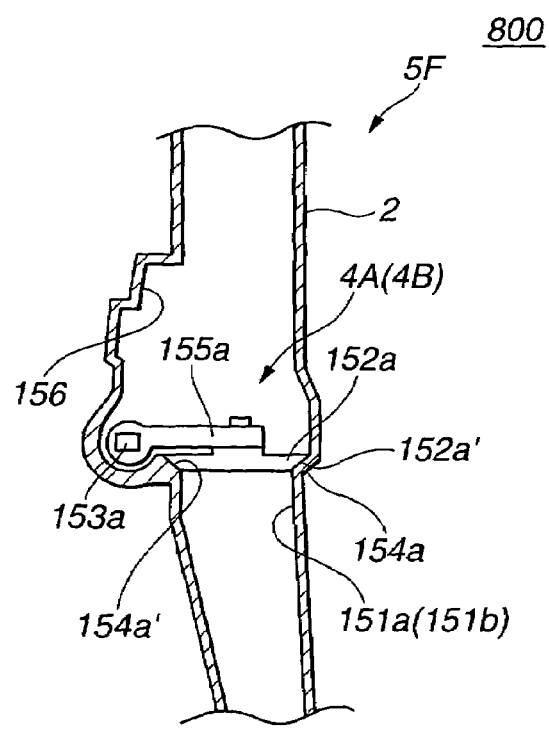
FIG. 16 is a sectional view of one switch valve of the switch valve unit of FIG. 15, that is, a sectional view of the portion indicated by the arrow "XVI" of FIG. 15.
Figure 17:
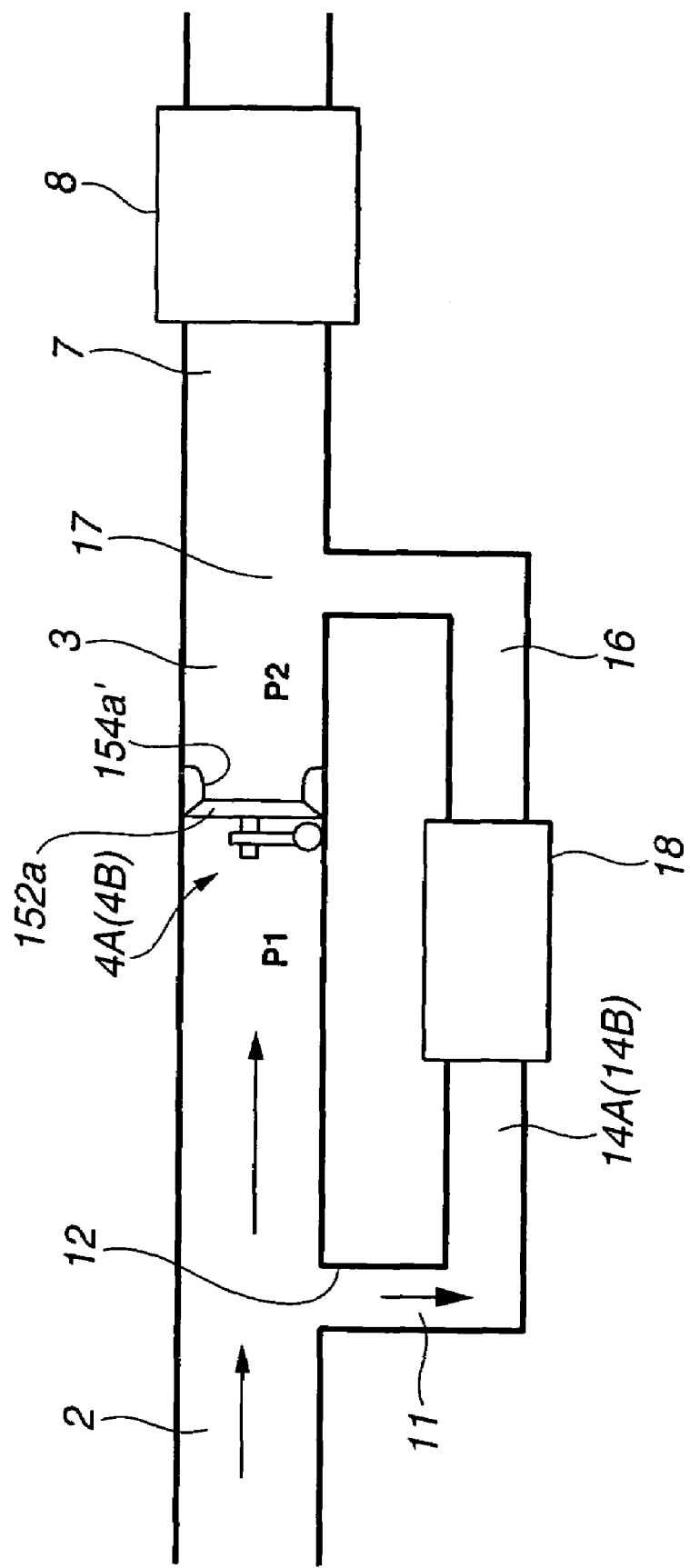
FIG. 17 is a schematic illustration showing operation of the switch valve unit in case of the eighth embodiment.

Referring to FIGS. 15 to 17, particularly FIGS. 15 and 16, there is shown a switch valve unit 5F that is employed in an exhaust system 800 of an eighth embodiment of the present invention.

This eight embodiment 800 is substantially the same as the above-mentioned first embodiment 100 (see FIG. 1) except for the followings.

Each bypass exhaust passage 11 has a cross-sectional area sufficiently smaller than that of main exhaust passage 2. Thus, a gas flow resistance shown by each bypass exhaust passage 11 is higher than that of main exhaust passage 2. More specifically, the gas flow resistance of a bypass exhaust line that extends from the branched portion 12 to the junction portion 17 is sufficiently higher than that of a main exhaust line that extends from the branched portion 12 to the junction portion 17, because of the reduced cross section and presence of auxiliary catalytic converter 18.

In the illustrated example of FIG. 1, the four upstream bypass exhaust passages 11 are joined at two junction portions 13 and make the two bypass exhaust passages 14A and 14B for shortening the entire length of the bypass exhaust line for the purpose of reducing the heat capacity of the bypass exhaust line and reducing the heat radiation surface of the same. However, in the eight embodiment 800, the layout of the bypass exhaust line for such purposes is at will. If, for example, auxiliary catalytic converter 18 is arranged in one-sided position with respect to the row of the four cylinders of the engine, a layout may be employed wherein two upstream bypass exhaust passages 11 are joined at a generally right angle.

Furthermore, in the eighth embodiment 800, a modified switch valve unit 5F is used in place of the switch valve unit 5A of the first embodiment 100.

As will be described in detail hereinafter, the modified switch valve unit 5F is so constructed as to effectively use the exhaust gas pressure as means for biasing valve plates thereof toward their closed position to assure a sealing of the valve plates being in the closed position.

In the following, switch valve unit 5F that includes switch valves 4A and 4B will be described in detail with reference to FIGS. 15 and 16. FIG. 15 is a plan view of switch valve unit 5F and FIG. 16 is a sectional view of one switch valve of switch valve 4A of the unit 5F, that is, the sectional view of the portion indicated by an arrow "XVI" of FIG. 15.

As is seen from FIG. 15, switch valve unit 5F comprises switch valves 4A and 4B which are combined to constitute a single unit.

As will be understood from FIG. 1, also in the eight embodiment 800, like in the first embodiment 100, each switch valve 4A or 4B is constructed to selectively take an open position wherein the paired upstream main exhaust passages 2 and 2 are communicated with the first or second intermediate main exhaust passage 3A or 3B and a closed position wherein the paired main exhaust passages 2 and 2 are not communicated with the first or second intermediate main exhaust passage 3A or 3B.

Referring back to FIG. 15, each switch valve 4A or 4B comprises two circular valve plates 152a and 152a (or 152b and 152b) that are connected to a common pivot shaft 153a or 153b through respective arms 155a and 155a (or 155b and 155b), and two circular valve openings 151a and 151a (or 151b and 151b) that are provided in a base wall structure and have valve seat portions 154a (see FIG. 16).

As is seen from FIG. 16, each valve seat portion 154a is formed with a tapered seat surface 154a' that can intimately receive a tapered periphery 152a' of the corresponding valve plate 152a or 152b.

Each upstream main exhaust passage 2 is formed near the corresponding valve plate 152a or 152b with a recessed portion 156 for receiving the valve plate 152a or 152b being in an open position.

As is easily understood from FIG. 16, in each switch valve 4A or 4B, circular valve plate 152a or 152b is arranged at an upstream position relative to the corresponding valve seat portion 154a, so that a differential pressure produced between upstream and downstream positions relative to valve plate 152a or 152 functions to bias the valve plate in a valve closing direction, that is, in a clockwise direction in FIG. 16.

Although not shown in the drawings, the two common pivot shafts 153a and 153b are controlled by a single actuator through respective link mechanisms. That is, when the actuator is operated to run in one direction, the four circular valve plates 152a and 152b are pivoted to their open position, and when the actuator is operated to run in the other direction, the valve plates 152a and 152b are pivoted to their closed position.

As is understood from FIG. 16, for taking the closed position, each valve plate 152a or 152b pivots in a downstream direction, that is, in a direction from an upstream position to a downstream position with respect to the flow of the exhaust gas. Thus, when valve plate 152a or 152b takes the closed position, there is produced a certain differential pressure between the upstream and downstream zones, which biases valve plate 152a or 152b against the tapered seat surface 154a' thereby to assure the sealing between valve plate 152a or 152b and the seat surface 154a'. This phenomenon will be much clearly understood from the following description when taken in conjunction with FIG. 17.

As is seen from FIG. 17, the bypass passage line including upstream bypass exhaust passages 11, first and second intermediate bypass exhaust passages 14A and 14B, auxiliary catalytic converter 18 and downstream bypass exhaust passage 16 has a relatively large gas flow resistance due to its inherent construction. Actually, auxiliary catalytic converter 18 shows a certain pressure loss which causes the increase of the gas flow resistance of the bypass passage line. Accordingly, the pressure "P1" exerted at a position just upstream of the valve plate 152a or 152b is larger than the pressure "P2" exerted at a position just downstream of valve plate 152a or 152b. Thus, when valve plate 152a or 152b takes its closed position, the sealing between valve plate 152a or 152b and the tapered seat surface 154a' is assured. It has been revealed that such desired sealing is not affected even when the pulsation of the exhaust gas is applied to valve plates 152a and 152b.

It is to be noted that due to provision of auxiliary catalytic converter 18, the pulsation of the pressure "P2" is suitably attenuated. Furthermore, as is seen from FIGS. 1 and 15, the two valve plates 152a and 152a (or 152b and 152b) connected by the common pivot shaft 153a or 153b are respectively exposed to the paired upstream exhaust passages 2 that transport the exhaust gases whose pulsations are different from each other. This phenomenon promotes the sealing effected between each valve plate and valve seat.

For the reasons as mentioned hereinabove, in the eighth embodiment 800, when taking their closed position, the switch valves 4A and 4B can take an assured sealing condition, and thus, substantially all exhaust gas can be led to the bypass passage line and to the auxiliary catalytic converter 18, which promotes the early activation of the converter 18.

Figure 18:
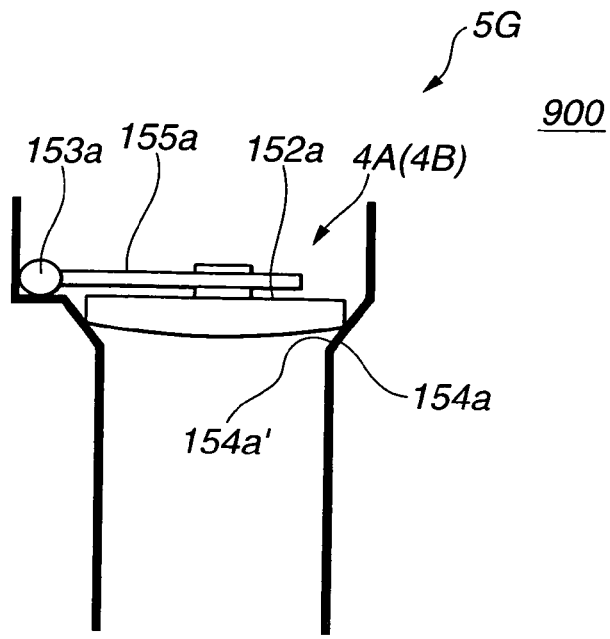
FIG. 18 a sectional view similar to FIG. 16, but showing a switch valve unit that is to be installed in an exhaust system of a ninth embodiment of the present invention.

Referring to FIG. 18, there is shown but partially a switch valve unit 5G that is employed in an exhaust system 900 of a ninth embodiment of the present invention.

In the switch valve 4A or 4B of the switch valve unit 5G, each circular valve plate 152a or 152b has no tapered peripheral edge. That is, in this case, a line contact is established between valve plate 152a or 152b and the tapered seat surface 154a' when valve plate takes its closed position. As shown, circular valve plate 152a or 152b has a convex outer surface.

Figure 19:
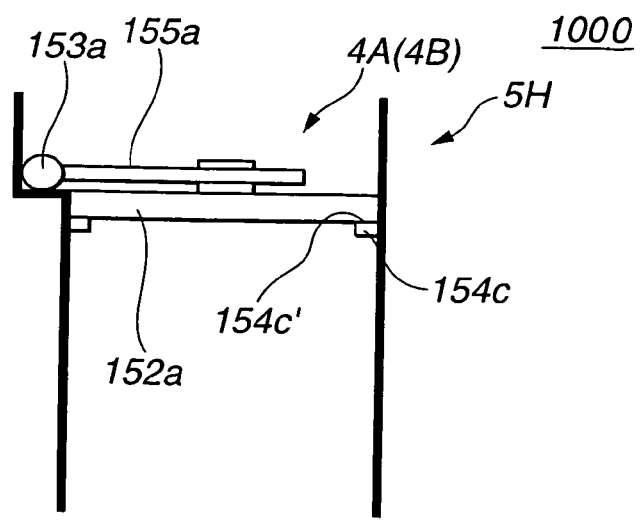
FIG. 19 is a sectional view also similar to FIG. 16, but showing a switch valve unit that is to be installed in an exhaust system of a tenth embodiment of the present invention.

Referring to FIG. 19, there is shown but partially a switch valve unit 5H that is employed in an exhaust system 1000 of a tenth embodiment of the present invention.

In the switch valve 4A or 4B of the switch valve unit 5H, an annular ring member 154c is used for producing a valve seat portion that has a seat surface 154c'. Upon taking a closed position, circular valve plate 152a or 152b abuts against the seat surface 154c' at a peripheral edge thereof, as shown.

In the foregoing description, the present invention is directed to the in-line four cylinder internal combustion engine 31, the present invention is widely applicable to various types of multi-cylinder internal combustion engine including in-line type and V-type.

The entire contents of Japanese Patent Applications 2004-169394 filed Jun. 8, 2004, 2004-205357 filed Jul. 13, 2004 and 2005-111478 filed Apr. 8, 2005 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An exhaust system of a multi-cylinder type internal combustion engine, comprising:
   a plurality of upstream main exhaust passages connected to the cylinders of the engine respectively;
   a downstream main exhaust passage that is connected to the upstream main exhaust passages;
   a main catalytic converter mounted in the downstream main exhaust passage;
   a plurality of upstream bypass exhaust passages that extend from the upstream main exhaust passages respectively;
   a downstream bypass exhaust passage that is connected to the upstream bypass exhaust passages, the downstream bypass exhaust passage having a downstream end connected to the downstream main exhaust passage at a position upstream of the main catalytic converter;

an auxiliary catalytic converter mounted in the downstream bypass exhaust passage;

a gas flow switching device that is capable of forcing the exhaust gas from the cylinders of the engine to flow toward the upstream bypass exhaust passages when assuming a given operation position, in which the gas flow switching device comprises switch valves that are operatively mounted in the upstream main exhaust passages respectively, the switch valves configured to close the upstream main exhaust passages respectively, wherein each upstream bypass passage has a cross-sectional area smaller than that of the corresponding upstream main exhaust passage;

first, second, third and fourth upstream main exhaust passages, as portions of the upstream main exhaust passage, extending from first, second, third and fourth cylinders of the engine, the first and fourth cylinders being those whose firing order is not successive and the second and third cylinders being those whose firing order is not successive;

a first intermediate main exhaust passage that is provided by joining downstream ends of the first and fourth upstream main exhaust passages;

a second intermediate main exhaust passage that is provided by joining downstream ends of the second and third upstream main exhaust passages;

wherein the downstream main exhaust passage is provided by joining downstream ends of the first and second intermediate main exhaust passages;

wherein the upstream bypass exhaust passages include first, second, third and fourth upstream bypass exhaust passages, the first and second upstream bypass exhaust passages respectively extending from upstream portions of the first and second upstream main exhaust passages;

the third and fourth upstream bypass exhaust passages respectively extending from upstream portions of the third and fourth upstream main exhaust passages;

a first intermediate bypass exhaust passage that is provided by jointing downstream ends of the first and second upstream bypass exhaust passages; and a second intermediate bypass exhaust passage that is provided by joining downstream ends of the third and fourth upstream bypass exhaust passages;

wherein the downstream bypass exhaust passage is provided by joining downstream ends of the first and second intermediate bypass exhaust passages, the downstream bypass exhaust passage having a downstream end connected to the downstream main exhaust passage at a position upstream of the main catalytic converter, wherein the switch valves comprise a first switch valve and a second switch valve, the first switch valve selectively opens and closes a fluid communication between each of the first and fourth upstream main exhaust passages and the first intermediate main exhaust passage; and the second switch valve selectively opens and closes a fluid communication between each of the second and third upstream main exhaust passages and the second intermediate exhaust passage, in which the first and second switch valves are integrally mounted in a valve unit, in which an inlet opening of an exhaust gas recirculation system is exposed to an interior of the auxiliary catalytic converter to introduce thereinto the gas flowing in the auxiliary catalytic converter.

2. An exhaust system of an in-line four cylinder internal combustion engine, comprising:

first, second, third and fourth upstream main exhaust passages extending from first, second, third and fourth cylinders of the engine, the first and fourth cylinders being those whose firing order is not successive and the second and third cylinders being those whose firing order is not successive;

a first intermediate main exhaust passage that is provided by joining downstream ends of the first and fourth upstream main exhaust passages;

a second intermediate main exhaust passage that is provided by joining downstream ends of the second and third upstream main exhaust passages;

a downstream main exhaust passage that is provided by joining downstream ends of the first and second intermediate main exhaust passages;

a main catalytic converter mounted in the downstream main exhaust passage;

first and second upstream bypass exhaust passages respectively extending from upstream portions of the first and second upstream main exhaust passages;

third and fourth upstream bypass exhaust passages respectively extending from upstream portions of the third and fourth upstream main exhaust passages;

a first intermediate bypass exhaust passage that is provided by jointing downstream ends of the first and second upstream bypass exhaust passages;

a second intermediate bypass exhaust passage that is provided by joining downstream ends of the third and fourth upstream bypass exhaust passages;

a downstream bypass exhaust passage that is provided by joining downstream ends of the first and second intermediate bypass exhaust passages, the downstream bypass exhaust passage having a downstream end connected to the downstream main exhaust passage at a position upstream of the main catalytic converter;

an auxiliary catalytic converter mounted in the downstream bypass exhaust passage; and switch valves respectively mounted in the first, second, third and fourth upstream main exhaust passages.

3. An exhaust system as claimed in claim 2, in which an inlet opening of an exhaust gas recirculation system is exposed to an interior of the auxiliary catalytic converter to introduce thereinto the gas flowing in the auxiliary catalytic converter.

4. An exhaust system of an internal combustion engine having at least one cylinder, comprising:

a main exhaust passage connected to the cylinder;

a main catalytic converter disposed in the main exhaust passage;

a bypass exhaust passage that diverges from the main exhaust passage, the bypass exhaust passage having a gas flow resistance larger than that of the main exhaust passage and having a downstream end connected to the main exhaust passage at a position upstream of the main catalytic converter;

an auxiliary catalytic converter disposed in the bypass exhaust passage; and a gas flow switching device that is capable of forcing exhaust gas from the cylinder of the engine to flow toward the bypass exhaust passage when assuming a given operation position, in which the gas flow switching device is a switch valve installed in the main exhaust passage at a position downstream of the diverging point from which the bypass exhaust passage diverges, the switch valve including a movable valve plate that is capable of closing the main exhaust passage when taking a closed position, wherein the switch valve is so arranged and constructed that when taking the closed position under operation of the engine, the valve plate is biased in a direction of the closed position by a differential pressure produced between upstream and downstream positions of the main exhaust passage relative to the valve plate.

5. An exhaust system as claimed in claim 4, in which the auxiliary catalytic converter is arranged in a manner to increase the gas flow resistance in the bypass exhaust passage.

6. An exhaust system as claimed in claim 4, in which the bypass exhaust passage has a cross-sectional area smaller than that of the main exhaust passage.

7. An exhaust system as claimed in claim 4, in which the bypass exhaust passage has a cross-sectional area smaller than that of the main exhaust passage, and in which the auxiliary catalytic converter is arranged to induce a given pressure loss causing increase of the air flow resistance in the bypass exhaust passage.

8. An exhaust system as claimed in claim 4, in which the differential pressure produced between the upstream and downstream positions of the main exhaust passage relative to the valve plate is so controlled as not to cause the valve plate to open from the closed position even when a pulsation of the exhaust gas is applied to the valve plate.

9. An exhaust system as claimed in claim 4, in which the switch valve further comprises:
 a pivot structure for inducing a pivotal movement of the movable valve plate; and
 a valve seat provided in the main exhaust passage, the valve seat intimately receiving a peripheral portion of the valve plate when the valve plate takes the closed position.

10. An exhaust system as claimed in claim 9, in which the valve seat is formed with a tapered seat surface for intimately receiving the peripheral portion of the valve plate.

11. An exhaust system as claimed in claim 10, in which the peripheral portion of the valve plate is formed with a tapered surface that is intimately received on the tapered seat surface of the valve seat when the valve plate takes the closed position.

12. An exhaust system as claimed in claim 9, in which the pivotal structure comprises a pivot shaft that is pivotally held by the main exhaust passage, and an arm through which the valve plate is connected to the pivot shaft.

13. An exhaust system of an internal combustion engine having at least one cylinder, comprising:
 a main exhaust passage connected to the cylinder;
 a main catalytic converter disposed in the main exhaust passage;
 a bypass exhaust passage that diverges from the main exhaust passage, the bypass exhaust passage having a gas flow resistance larger than that of the main exhaust passage and having a downstream end connected to the main exhaust passage at a position upstream of the main catalytic converter;
 an auxiliary catalytic converter disposed in the bypass exhaust passage; and
 a gas flow switching device that is capable of forcing exhaust gas from the cylinder of the engine to flow toward the bypass exhaust passage when assuming a given operation position,
 wherein the internal combustion engine is of a multi-cylinder type having a plurality of cylinders;
 wherein the main exhaust passage comprises:
  a plurality of upstream main exhaust passages connected to the cylinders of the engine respectively; and
  a downstream main exhaust passage that is connected to the upstream main exhaust passages;
 wherein the main catalytic converter is disposed in the downstream main exhaust passage;
 wherein the bypass exhaust passage comprises:
  a plurality of upstream bypass exhaust passages that diverge from the upstream main exhaust passages respectively, each upstream bypass exhaust passage having a sectional area smaller than that of the corresponding upstream main exhaust passage; and
  a downstream bypass exhaust passage that is connected to the upstream bypass exhaust passages, the downstream bypass exhaust passage having a downstream end connected to the downstream main exhaust passage at a position upstream of the main catalytic converter;
 wherein the auxiliary catalytic converter is disposed in the downstream bypass exhaust passage;
 wherein the gas flow switching device comprises a plurality of switch valves, each switch valve being respectively installed in the corresponding upstream main exhaust passage at a position downstream of the diverging point from which the corresponding upstream bypass exhaust passage diverges, each switch valve including a movable valve plate that is capable of closing the corresponding upstream main exhaust passage when taking a closed position; and
 wherein each switch valve is so arranged and constructed that when taking the closed position under operation of the engine, the valve plate is biased in a direction of the closed position by a differential pressure produced between upstream and downstream positions of the corresponding upstream main exhaust passage relative to the valve plate.

14. An exhaust system as claimed in claim 13, in which the valve plates of the switch valves are connected to a common pivot shaft through respective arms, so that the valve plates operate synchronously.

15. An exhaust system as claimed in claim 13, in which the auxiliary catalytic converter is arranged in a manner to increase the gas flow resistance in the bypass exhaust passage.

16. An exhaust system as claimed in claim 13, in which the upstream bypass exhaust passage has a cross-sectional area smaller than that of the corresponding upstream main exhaust passage.

17. An exhaust system as claimed in claim 13, in which the upstream bypass exhaust passage has a cross-sectional area smaller than that of the corresponding upstream main exhaust passage, and in which the auxiliary catalytic converter is arranged to induce a given pressure loss causing increase of the air flow resistance in the bypass exhaust passage.

18. An exhaust system as claimed in claim 13, in which the differential pressure is so controlled as not to cause the valve plate to open from the closed position even when a pulsation of the exhaust gas is applied to the valve plate.

19. An exhaust system as claimed in claim 13, in which each switch valve further comprises:
 a pivot structure for inducing a pivotal movement of the valve plate; and a valve seat provided in the main exhaust passage, the valve seat intimately receiving a peripheral portion of the valve plate when the valve plate takes the closed position.

20. An exhaust system as claimed in claim 19, in which the valve seat is formed with a tapered seat surface for intimately receiving the peripheral portion of the valve plate.

21. An exhaust system as claimed in claim 20, in which the peripheral portion of the valve plate is formed with a tapered surface that is intimately received on the tapered seat surface of the valve seat when the valve plate takes the closed position.

* * * * *